(12) United States Patent
Zheng et al.

(10) Patent No.: US 10,685,065 B2
(45) Date of Patent: Jun. 16, 2020

(54) METHOD AND SYSTEM FOR RECOMMENDING CONTENT TO A USER

(75) Inventors: Zhaohui Zheng, Beijing (CN); Xin Li, Beijing (CN); Rongqing Lu, Beijing (CN); Shuanghong Yang, Beijing (CN)

(73) Assignee: HAIZHI WANGJU NETWORK TECHNOLOGY (BEIJING) CO., LTD., Beijing (CN)

(*) Notice: Subject to any disclaimer, the term of this patent is extended or adjusted under 35 U.S.C. 154(b) by 650 days.

(21) Appl. No.: 14/385,274

(22) PCT Filed: Mar. 17, 2012

(86) PCT No.: PCT/CN2012/072495
§ 371 (c)(1),
(2), (4) Date: Dec. 12, 2014

(87) PCT Pub. No.: WO2013/138969
PCT Pub. Date: Sep. 26, 2013

(65) Prior Publication Data
US 2015/0112918 A1    Apr. 23, 2015

(51) Int. Cl.
*G06F 16/9032* (2019.01)
*G06F 16/9535* (2019.01)
(Continued)

(52) U.S. Cl.
CPC .... *G06F 16/90324* (2019.01); *G06F 16/9535* (2019.01); *G06N 5/047* (2013.01); *G06Q 30/02* (2013.01)

(58) Field of Classification Search
CPC .......... G06F 17/3097; G06F 17/30867; G06F 17/3053; G06F 17/30598; G06N 5/047; G06Q 30/02; G06Q 30/0631
See application file for complete search history.

(56) References Cited

U.S. PATENT DOCUMENTS 6,981,040 B1 * 12/2005 Konig ............... G06F 17/30867
707/E17.109
8,458,115 B2 * 6/2013 Cai ....................... G06F 16/353
706/52

(Continued)

FOREIGN PATENT DOCUMENTS

| CN | 1295294 A | 5/2001 |
| CN | 101901450 A | 12/2010 |
| WO | 2012030400 A1 | 3/2012 |

OTHER PUBLICATIONS

Notice of Allowance dated Aug. 24, 2016 in U.S. Appl. No. 14/385,220.

(Continued)

*Primary Examiner* — Kamran Afshar
*Assistant Examiner* — Ying Yu Chen
(74) *Attorney, Agent, or Firm* — Pillsbury Winthrop Shaw Pittman LLP

(57) ABSTRACT

Method, system, and programs for recommending content to a user. First information related to one or more previous users is first obtained. A model that maps from users to topics of interest is then established based on the first information related to the one or more previous users. Second information related to the current user is also obtained. One or more topics of interest are identified for the current user based on the model. Content is recommended to the current user in accordance with the one or more topics of interest for the current user. Eventually, an updated model is generated by integrating information associated with the current user with the model established based on the first information related to the one or more previous users. The information associated with the current user includes the second information related to the current user.

41 Claims, 23 Drawing Sheets

(51) Int. Cl.
  *G06Q 30/02* (2012.01)
  *G06N 5/04* (2006.01)

(56) References Cited

U.S. PATENT DOCUMENTS

| | | | |
|---|---|---|---|
| 2003/0195793 A1* | 10/2003 | Jain | G06Q 30/02 |
| | | | 705/7.32 |
| 2006/0074883 A1 | 4/2006 | Teevan | |
| 2007/0118498 A1* | 5/2007 | Song | G06F 17/30702 |
| 2008/0114751 A1 | 5/2008 | Cramer | |
| 2008/0120289 A1 | 5/2008 | Golan | |
| 2010/0004975 A1 | 1/2010 | White et al. | |
| 2010/0250556 A1* | 9/2010 | Park | G06F 17/30699 |
| | | | 707/749 |
| 2010/0268661 A1* | 10/2010 | Levy | G06Q 30/02 |
| | | | 705/347 |
| 2010/0268704 A1 | 10/2010 | Chou | |
| 2011/0112994 A1* | 5/2011 | Goto | G06Q 30/02 |
| | | | 706/12 |
| 2012/0166179 A1 | 6/2012 | Tirumalachetty | |
| 2013/0238432 A1* | 9/2013 | Bai | G06F 17/30867 |
| | | | 705/14.52 |
| 2014/0074639 A1* | 3/2014 | Tian | G06Q 30/0631 |
| | | | 705/26.1 |
| 2015/0058320 A1 | 2/2015 | Zheng | |

OTHER PUBLICATIONS

International Search Report dated Dec. 20, 2012 in International Application No. PCT/CN2012/072495.
Office Action dated Nov. 22, 2017 in U.S. Appl. No. 15/358,597.
Office Action dated Mar. 29, 2018 in U.S. Appl. No. 15/358,597.
Office Action dated Mar. 1, 2019 in U.S. Appl. No. 15/358,597.
Notice of Allowance dated Sep. 11, 2019 in U.S. Appl. No. 15/358,597.

* cited by examiner

METHOD AND SYSTEM FOR RECOMMENDING CONTENT TO A USER

BACKGROUND

1. Technical Field

The present teaching relates to methods, systems, and programming for Internet services. Particularly, the present teaching relates to methods, systems, and programming for providing information to Internet users.

2. Discussion of Technical Background

Online recommendation systems are a subclass of information filtering systems that predict an "interest" that a user would have in online content (such as articles, news, music, books, or movies), using a model built based on the characteristics of users and the content related thereto and the user's online behaviors. For example, traditional recommendation systems typically produce a list of recommendations in one of two ways—through collaborative filtering or content-based filtering. Collaborative filtering approaches build a model from a user's past behaviors (e.g., merchants previously purchased or selected, numerical ratings given to those merchants), as well as similar decisions made by other users, and use that model to predict other items that the user may be interest in. Content-based filtering approaches utilize a series of discrete characteristics of known content in order to recommend additional content with similar properties.

The prediction accuracy of the traditional recommendation systems is mainly relied on the amount of user's past behavior data that the recommendation system can obtain. For example, in order to estimate topics that a user would be interested in, traditional recommendation systems need to monitor and collect as much of the user's past online activities and related content as possible. However, if the user is new to a recommendation system, it would be very difficult for the recommendation system to obtain enough past behavior data of the new user in order to make a meaningful recommendation. Furthermore, traditional recommendation systems usually only acquire data voluntarily provided by users, e.g., through questionnaires, or data recorded by the recommendation systems when users are directly interacting with the recommendation systems, e.g., cookies or activity logs when the users are signing in the recommendation systems. As a result, inactive users of the recommendation systems cannot be used to provide data for building recommendation models. Accordingly, for new users or inactive users, the traditional recommendation systems become less effective in personalized content recommendation. In addition, traditional systems usually consider only explicit relationships among users, and interests of users explicitly expressed based on their online content consumption activities. Implicit relationships, although handled in some existing technologies, are most identified via ad hoc approaches.

Therefore, there is a need to provide an improved solution for personalized content recommendation based on information associated with users, whether such information is static, dynamic, explicit or implicit, all in a systematic and effective manner to solve the above-mentioned problems.

SUMMARY

The present teaching relates to methods, systems, and programming for recommending content to a user.

In one example, a method implemented on at least one machine, each of which has at least one processor, storage, and a communication platform connected to a network for recommending content to a current user is disclosed. First information related to one or more previous users is first obtained. A model that maps from users to topics of interest is then established based on the first information related to the one or more previous users. Second information related to the current user is also obtained. One or more topics of interest are identified for the current user based on the model. Content is recommended to the current user in accordance with the one or more topics of interest for the current user. Eventually, an updated model is generated by integrating information associated with the current user with the model established based on the first information related to the one or more previous users. The information associated with the current user includes the second information related to the current user.

In another example, a method implemented on at least one machine, each of which has at least one processor, storage, and a communication platform connected to a network for recommending content to a user is disclosed. A model is first established for estimating topics of interest for the user based on information related to the user. The model maps from a plurality of users to a plurality of topics of interest based on information related to the plurality of users. Dynamic information related to the plurality of users is then collected. The established model is refined based on the collected dynamic information related to the plurality of users. Eventually, content with at least one topic of interest is recommended to the user, where the at least one topic of interest is estimated based on the refined model.

In still another example, a method implemented on at least one machine, each of which has at least one processor, storage, and a communication platform connected to a network for recommending content to a user is disclosed. A request for recommending content to a user is first received, and the information related to the user is also obtained. A model established based on information related to one or more previous users is then retrieved. One or more topics of interest for the user are identified based on the model that maps from users to topics of interest. Content in accordance with the one or more topics of interest for the user is then retrieved. Eventually, the content in the one or more topics of interest is provided as a response to the request.

In a different example, a system for recommending content to a current user is disclosed. The system includes a user characterization module, a modeling module, a user request processing unit, a topic estimation module, and a content recommendation module. The user characterization module is configured to obtain first information related to one or more previous users. The modeling module is configured to establish a model that maps from users to topics of interest based on the first information related to the one or more previous users. The user request processing unit is configured to obtain second information related to the current user. The topic estimation module is configured to identify one or more topics of interest for the current user based on the model. The content recommendation module is configured to recommend content to the current user in accordance with the one or more topics of interest for the current user. The modeling module is further configured to generate an updated model by integrating information associated with the current user with the model established based on the first information related to the one or more previous users. The information associated with the current user includes the second information related to the current user.

In still another different example, a system for recommending content to a user is disclosed. The system includes a user content/activity monitor and a content recommendation engine. The user content/activity monitor is configured to collect dynamic information related to a plurality of users. The content recommendation engine is configured to establish a model for estimating topics of interest for the user based on information related to the user. The model maps from the plurality of users to a plurality of topics of interest based on information related to the plurality of users. The content recommendation engine is further configured to refine the established model based on the collected dynamic information related to the plurality of users and recommend content with at least one topic of interest to the user, where the at least one topic of interest is estimated based on the refined model.

In yet another different example, a system for recommending content to a user is disclosed. The system includes a content recommendation engine and a content portal. The content recommendation engine is configured to obtain information related to the user. The content recommendation engine is further configured to retrieve a model that is established based on information related to one or more previous users and identify one or more topics of interest for the user based on the model that maps from users to topics of interest. The content portal is configured to receive a request for recommending content to a user. The content portal is further configured to retrieve content in accordance with the one or more topics of interest for the user and provide the content in the one or more topics of interest as a response to the request.

Other concepts relate to software for recommending content to a user. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine-readable tangible and non-transitory medium having information for recommending content to a current user recorded thereon, wherein the information, when read by the machine, causes the machine to perform a series of steps. First information related to one or more previous users is first obtained. A model that maps from users to topics of interest is then established based on the first information related to the one or more previous users. Second information related to the current user is also obtained. One or more topics of interest are identified for the current user based on the model. Content is recommended to the current user in accordance with the one or more topics of interest for the current user. Eventually, an updated model is generated by integrating information associated with the current user with the model established based on the first information related to the one or more previous users. The information associated with the current user includes the second information related to the current user.

In another example, a machine-readable tangible and non-transitory medium having information for recommending content to a user recorded thereon, wherein the information, when read by the machine, causes the machine to perform a series of steps. A model is first established for estimating topics of interest for the user based on information related to the user. The model maps from a plurality of users to a plurality of topics of interest based on information related to the plurality of users. Dynamic information related to the plurality of users is then collected. The established model is refined based on the collected dynamic information related to the plurality of users. Eventually, content with at least one topic of interest is recommended to the user, where the at least one topic of interest is estimated based on the refined model.

In still another example, a machine-readable tangible and non-transitory medium having information for recommending content to a user recorded thereon, wherein the information, when read by the machine, causes the machine to perform a series of steps. A request for recommending content to a user is first received, and the information related to the user is also obtained. A model established based on information related to one or more previous users is then retrieved. One or more topics of interest for the user are identified based on the model that maps from users to topics of interest. Content in accordance with the one or more topics of interest for the user is then retrieved. Eventually, the content in the one or more topics of interest is provided as a response to the request.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of recommending personalized content to a user. The method and system as disclosed herein is capable of recommending content of interests to both users that have established a history of online behavior and new users for whom only certain user attributes (e.g., age, gender, profession, home address, etc.) are available without any prior history information. The present teaching is also capable of inferring and/or deriving a user's implicit interests and preferences via, e.g., derivation or propagation, to obtain user-related information based on, e.g., information related to other existing users. Such inference may also be applied to inactive users, in order to be able to recommend content based on inferred interests in a systematic manner. Given that online activities continuous occur and change, the method and system as disclosed herein is capable of continuously refining the recommendation model by dynamically monitoring and updating user-related information and enhancing the recommendation model.

Figure 1A:
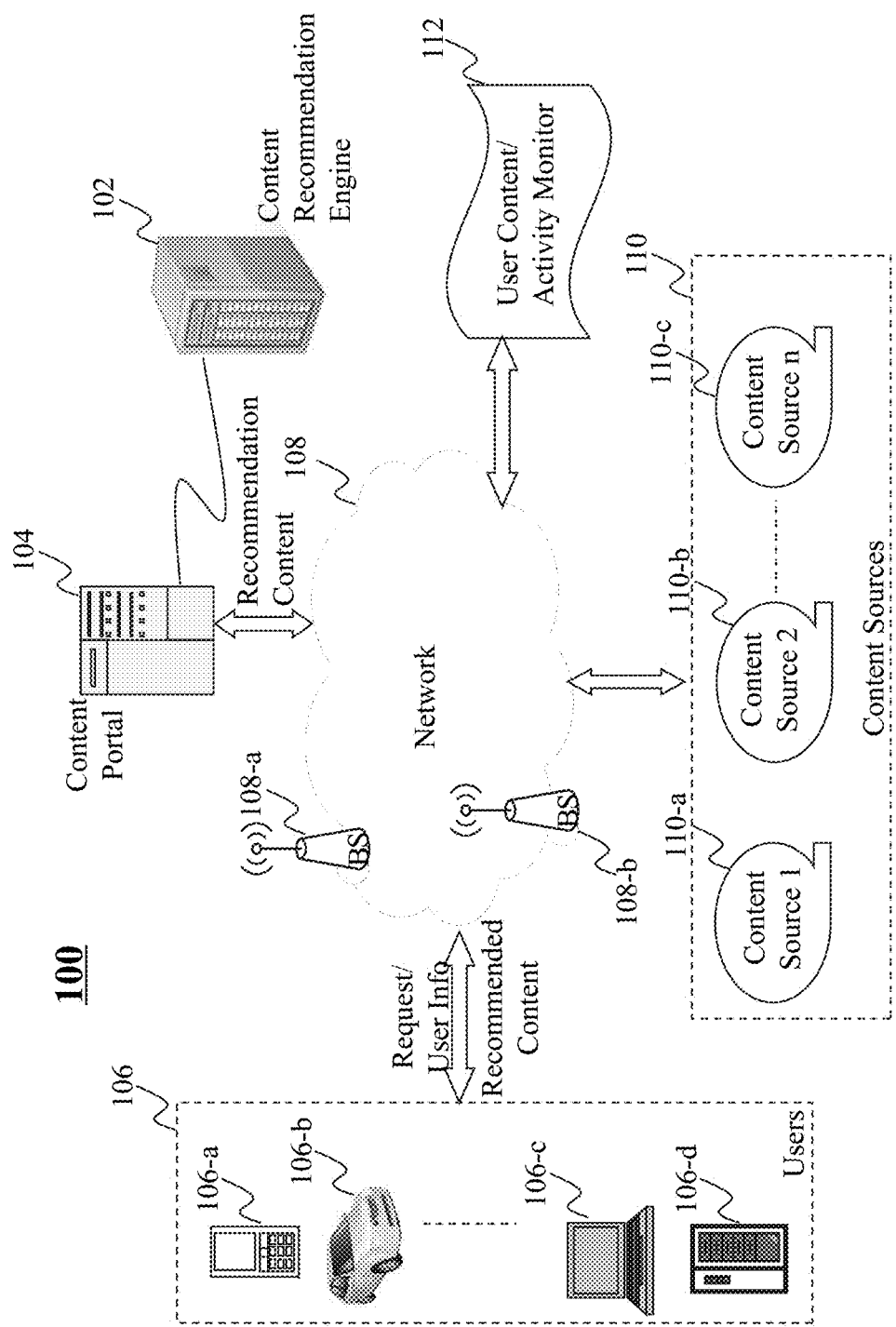
FIGS. 1(a) and 1(b) depict exemplary embodiments of a networked environment in which content recommendation is applied, according to different embodiments of the present teaching.
Figure 1B:
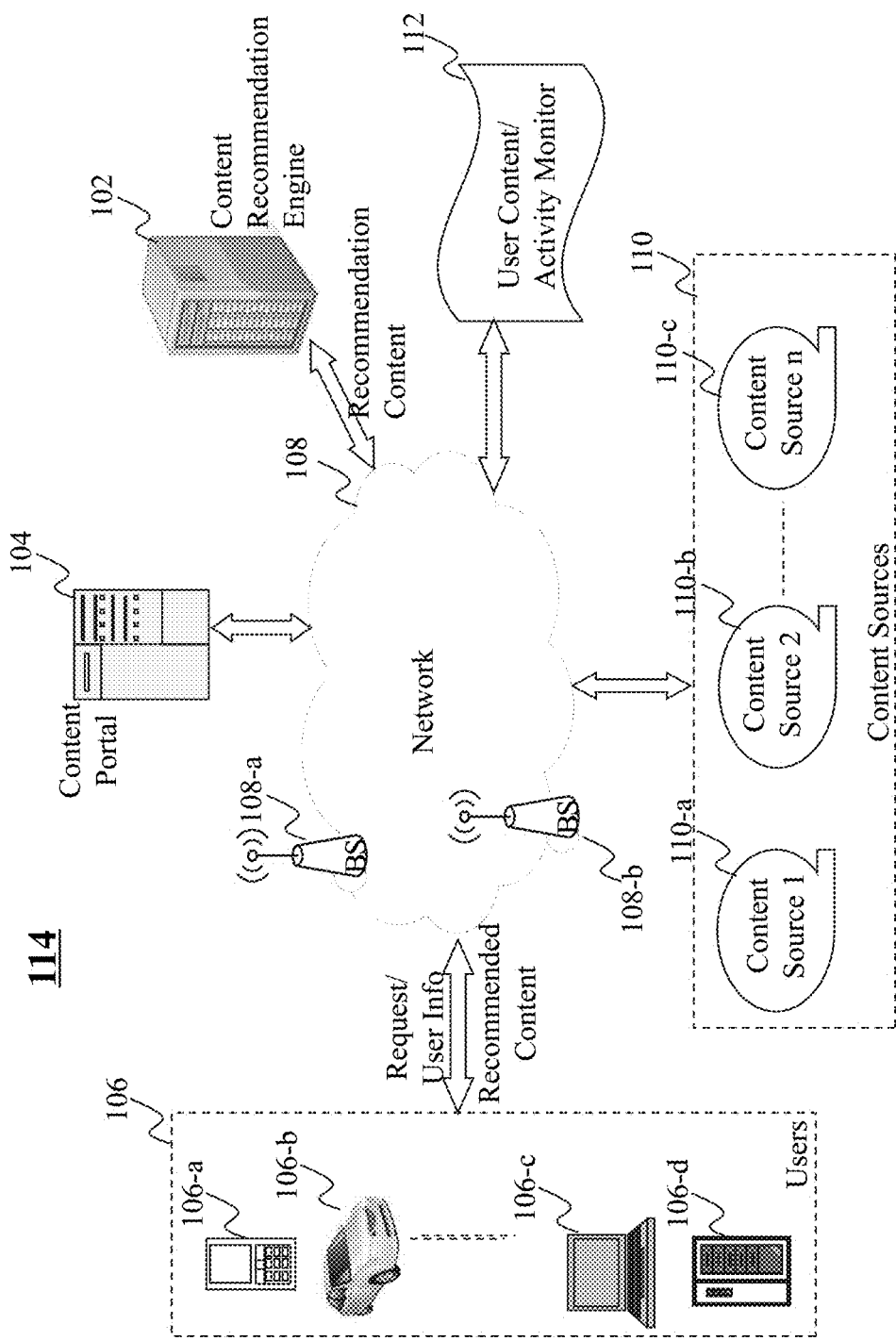

FIGS. 1(a) and 1(b) depict high level exemplary system configurations in which content recommendation is performed, according to different embodiments of the present teaching. In FIG. 1(a), the exemplary system 100 includes a content recommendation engine 102, a content portal 104, users 106, a network 108, content sources 110, and a user content/activity monitor 112. The network 108 may be a single network or a combination of different networks. For example, the network 108 may be a local area network (LAN), a wide area network (WAN), a public network, a private network, a proprietary network, a Public Telephone Switched Network (PSTN), the Internet, a wireless network, a virtual network, or any combination thereof. The network 108 may also include various network access points, e.g., wired or wireless access points such as base stations or Internet exchange points 108-a, . . . , 108-b, through which a data source may connect to the network in order to transmit information via the network.

Users 106 may be of different types such as users connected to the network 108 via desktop connections (106-d), users connecting to the network 108 via wireless connections such as through a laptop (106-c), a handheld device (106-a), or a built-in device in a motor vehicle (106-b). A user 106 may send a request and provide basic user information to the content portal 104 (e.g., a search engine, a social network site, etc.) via the network 108 and receive recommended content from the content portal 104 through the network 108. The content recommendation engine 102 in this example may work as backend support to provide estimated topics of interest for the user 106 to the content portal 104 based on basic information of the user 106. In some examples, more than one topics of interest may be ranked and provided to the content portal such that the content portal 104 may retrieve content for each topic and present content to the user 106 based on the ranking of the multiple estimated topics of interest.

The content sources 110 include multiple content sources 110-a, 110-b, . . . , 110-c. A content source may correspond to a web site hosted by an entity, whether an individual, a business, or an organization such as USPTO.gov, a content provider such as cnn.com and Yahoo.com, or a content feed source such as tweeter or blogs. Both the content recommendation engine 102 and content portal 104 may access information from any of the content sources 110-a, 110-b, . . . , 110-c to obtain dynamic information related to the users 106 or to identify and retrieve content based on estimated interests of the user. In one example, the user content activity monitor 112 act as a service provider, independent of the content recommendation engine 102, that monitors and gathers dynamic user-related content and activities and provides such collected information to the content recommendation engine 102 as the basis for continuously updating the recommendation model for recommending up-to-date personalized content to user 106. In some embodiments, the user content activity monitor 112 may be part of the content recommendation engine 102 (not shown here). In another example, the content portal 104 retrieves, from the content sources 110, content related to the interests estimated by the content recommendation engine 102.

FIG. 1(b) presents a similarly system configuration as what is shown in FIG. 1(a) except that the content recommendation engine 102 is now configured as an independent service provider that interacts with the users 106 directly to provide personalized content recommendation service. In the exemplary system 114, the content recommendation engine 102 may receive a request with some basic information from a user 106 and/or dynamic content associated with users and provide recommended content to the user directly without going through a third-party content portal 104.

Figure 2:
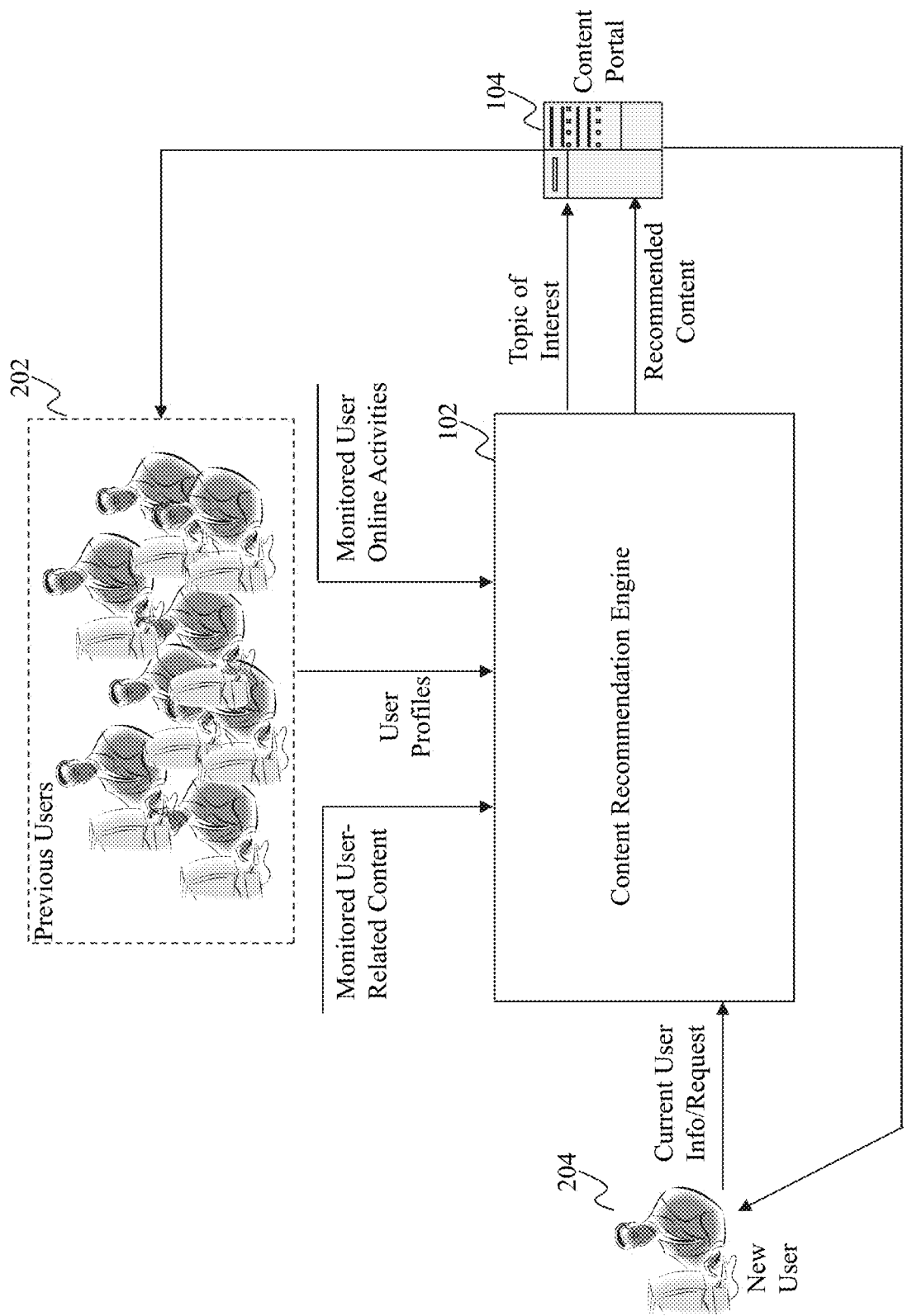
FIG. 2 is high level exemplary system diagrams of a system for recommending content to a user, according to an embodiment of the present teaching.

FIG. 2 is a high level illustration of the content recommendation engine 102, according to an embodiment of the present teaching. FIG. 2 depicts the basic inputs and outputs of the content recommendation engine 102. For previous (existing) users of the content recommendation engine 102, three types of user information may be obtained by the content recommendation engine 102: (1) monitored user-related content, such as content consumed by the user, content contributed by the user such as the user's own blog or micro-blog entry, user's comments on others' blogs or micro-blog entries, etc.; (2) user profiles, i.e., user's basic attributed stored in the user information archive of the content recommendation engine 102 or collected from other content sources 110; and (3) monitored user online activities, such as clicks, lack of clicks, online purchases made, or online gaming activities, etc. Different types of user information from the previous users 202 may dynamically change and thus, are continuously monitored and fed into the content recommendation engine 102. Based on characterization of information associated with existing users, the content recommendation engine 102 may build and refine a model for estimating topics of interest for such users (or for new users). When a new user 204 signs up with the content recommendation engine 102 with some basic user information such as attributes (or when the content portal 104 to which the content recommendation engine 102 provides its service provides such user information to the content recommendation engine 102), the content recommendation engine 102 may estimate the new user's topics of interest based on the new user information received, however simple, and present the recommended content on such estimated interests to the new user 204, either directly or through the content portal 104. The received new user's information as well as the initial recommended content on estimated topics of interest may then be user to expand the recommendation model so that the recommendation model now incorporates the new user's information to form an aggregated or integrated model (integrated in the sense that it is appended to the existing model for all other existing users). From that point on, any further online activities (including content consumed or contributed) of the new user are monitored and used to further refine the recommendation model so that content recommendations can be made adaptive.

Figure 3A:
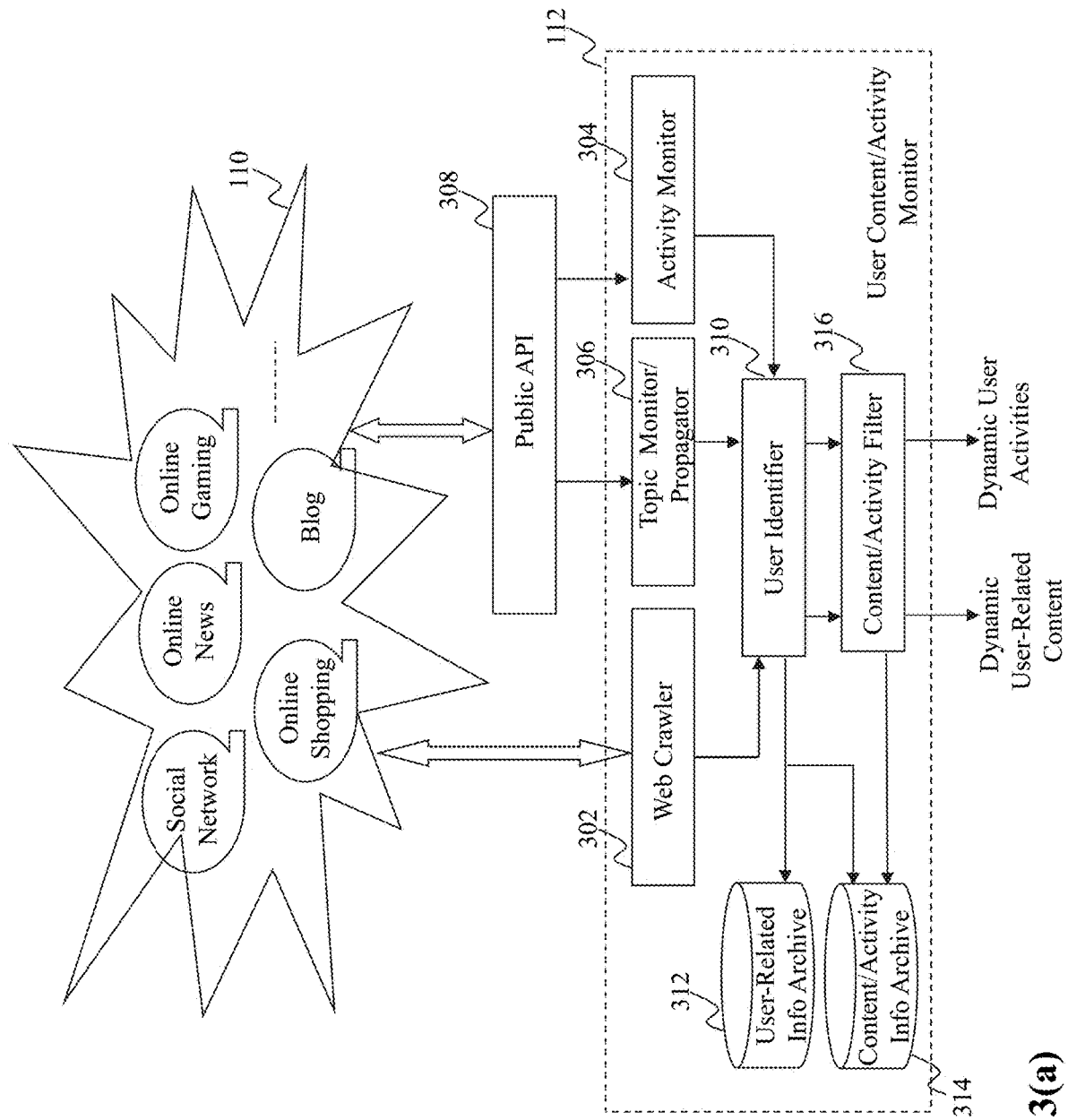
FIG. 3(a) is a system diagram for an exemplary user content/activity monitor of the system for recommending content to a user, according to an embodiment of the present teaching.

FIG. 3(a) is a system diagram for an exemplary user content/activity monitor 112 of the system for recommending content to a user, according to an embodiment of the present teaching. As discussed above, the user content/activity monitor 112 can be an independent service separate from the content recommendation engine 10, as shown in FIGS. 1(a) and 1(b), or may be part of the content recommendation engine 102. As noted above, any user information may be dynamically monitored and gathered by the user content/activity monitor 112. For example, content consumed by a user (news, articles, descriptions, blogs or any social network content) may be retrieved from any content source 110 through the network 108. Any content contributed by a user (blog, article, chat, twitter, etc.) may also be gathered by the user content/activity monitor. Such content sources may include, but are not limited to, social network sites (e.g., Facebook, Renren, QQ), online news sources, online gaming sites, online shopping sites, blogs, micro-blogs (e.g., Twitter, Sina Weibo). Such content may be identified via user's online activities, e.g., a click on a link leads to a different article, commenting on a blog entry leads to collecting the comment itself, forwarding an article to a friend may lead to additional content consumed by the friend on a similar topic, etc. User's online activities are thus informative as to the user's interests, particularly dynamic interests. Therefore, user's online activities may also be monitored and recorded by the user content/activity monitor 112.

Different types of user information may also be monitored and gathered through different mechanisms employed by the user content/activity monitor 112. For example, the user-related content and user profile may be collected by a web crawler 302, and the user activities may be monitored by an activity monitor 304 through, e.g., a public API 308 which may be provided by each content source 110. The user-related activities may include browsing through a website, clicking an advertisement, purchasing a product, following a business entity or an individual (e.g., a friend), commenting, forwarding, liking or sharing a blog or micro-blog entry, updating status of a social network account, etc. In addition, the user content/activity monitor 112 may include a topic monitor/propagator 306 which may be responsible for inferring the user's interests through, e.g., the user's activities and social graph in a social network setting. For example, the topic monitor/propagator 306 may be configured to apply link propagation methods to propagate labels (e.g., categories) of celebrities to every user in the social network based on the social graph and user activities (e.g., following, friends). The celebrity status of a social group member may be inferred by the number of followers in the social network. In general, the importance of a user in a social network can be inferred and the personal interests of an importance user who have significant number of followers may be used to infer the interests of the followers.

In order to associate the monitored user information to a correct user, a user identifier 310 may be deployed in the user content/activity monitor 112 to, for each piece of information gathered, identify the correspondence between the information and the correct user. The identified users and corresponding gathered content and activities may be saved in a user-related information archive 312 and a content/activity information archive 314 for future use. In this example, the user content/activity monitor 112 may further include a content/activity filter 316 for reducing the volume of content and activities that will be saved to maximize the efficiency with minimal risks of losing important relevant information. Such reduction of volume in collected data may be performed according to certain criteria. In one example, outdated content or activities over a threshold time period may be filtered out. In another example, repetitive information may be removed by the content/activity filter 316. In some embodiments, some filtered content and activities may be kept in a special storage (not shown) in the content/activity information archive 314. For example, unlawful content or activities may be detected and saved for future possible inquiry. As noted above, the user content/activity monitor 112 may be continuously collecting dynamic user-related content and dynamic user activities to enable the continuous update of the recommendation model.

Figure 3B:
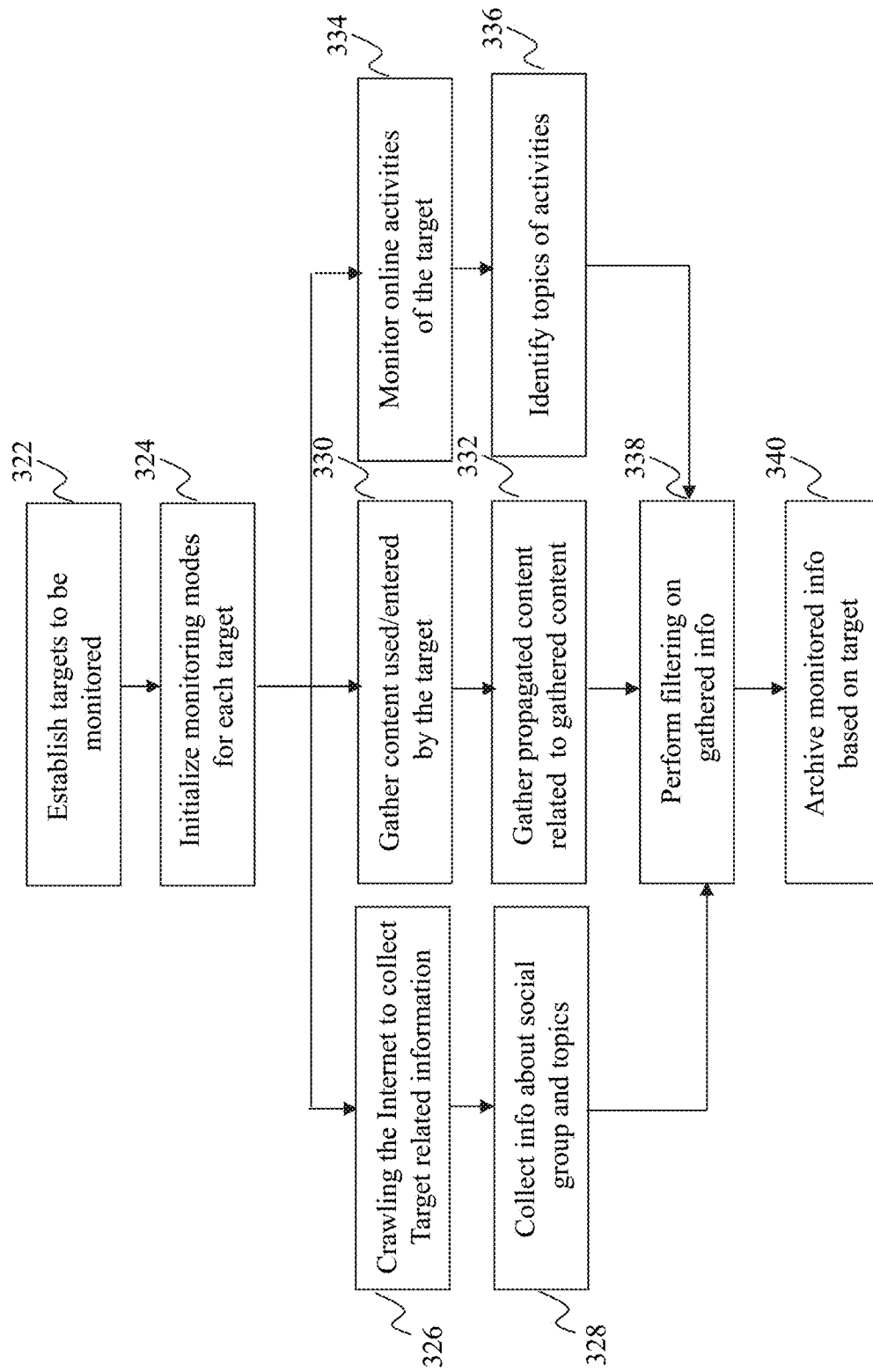
FIG. 3(b) is a flowchart of an exemplary process of the user content/activity monitor, according to an embodiment of the present teaching.

FIG. 3(b) is a flowchart of an exemplary process of the user content/activity monitor 112, according to an embodiment of the present teaching. At block 322, target users to be monitored are first established, for example, by the user identifier 310. Each target may be identified and established based on one or more attributes of a user, such as real name, personal identification number, user name, date of birth, etc. At block 324, one or more monitoring modes may be initialized for each target through different mechanisms, such as the web crawler 302, activity monitor 304, and topic monitor/propagator 306 in conjunction with public API 308. For example, at block 326, target-related information such as user profile appearing on any websites may be collected by crawling the Internet. In some embodiments, information about the social interest group and their topics may be further collected through web crawling at block 328. Additionally, at block 330, target-related content (e.g., content consumed or contributed by the target) may be gathered by the user content/activity monitor 112 through public API 308. At block 332, propagated content related to the content gathered at block 330 may be further obtained using link propagation methods based on the target's social graph in the social networks. In addition to target profile and target-related content, the target's online activities may be monitored at block 334, for example, by the activity monitor 304, through public API 308. At block 336, topics or categories of the target's online activities may be identified or inferred. Filtering may be applied at block 338 to information obtained through the above-mentioned monitoring modes/mechanisms to reduce volume of the collected information if necessary. Eventually, at block 340, the monitored information is archived for each target.

Figure 4A:
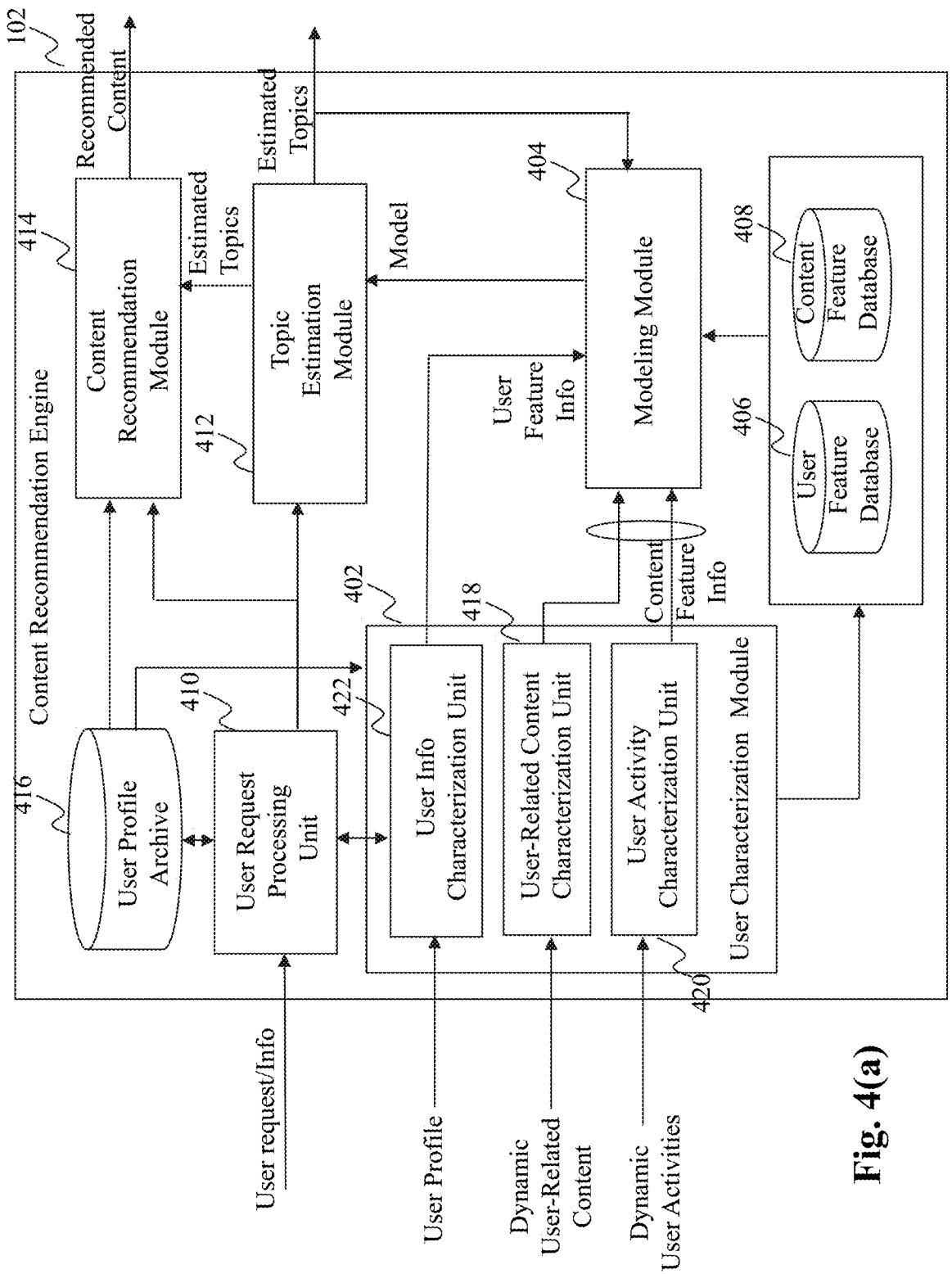
FIG. 4(a) is a system diagram for an exemplary content recommendation engine of the system for recommending content to a user, according to an embodiment of the present teaching.

FIG. 4(a) is a system diagram for an exemplary content recommendation engine 102 of the system for recommending content to a user, according to an embodiment of the present teaching. In response to receiving a request to recommend content to a new user or an existing user, the content recommendation engine 102 is configured to obtain information associated with user, whether such information is static, dynamic, explicit or implicit, and identify one or more topics of interest for the user based on a model that maps from users to topics of interest. The model is established based on information related to the existing users of the content recommendation engine 102. In some embodiments, for a new user who just signed up to the system, basic attributes of the new user, such as age, gender, profession, residency, etc., is sufficient for the content recommendation engine 102 to make recommendation based on the recommendation model. In other embodiments, for an existing user, every time when the existing user signs in the system, the content recommendation engine 102 is able to provide an up-to-date recommendation based on the continusily refined recommendation model and/or the dynamically refreshed user information and online behaviors. The content recommendation engine 102 in this example includes a user characterization module 402, a modeling module 404, a feature database 406, a topic database 408, a user request processing unit 410, a topic estimation module 412, a content recommendation module 414, and a user profile archive 416.

The user characterization module 402 in this example includes three units, each of which is responsible for processing one type of input dynamic user information. The dynamic user-related content and user activities are characterized by the user-related content characterization unit 418 and the user activity characterization unit 420, respectively, and are converted to content feature information, including topics/categories and keywords (e.g., represented by a content feature matrix B). The user profile (attributes) is characterized and converted to user feature information (e.g., represented by a user feature matrix A) by the user information characterization unit 422. Both the user and content feature information are fed into the modeling module 404 to generate a recommendation model for the topic estimation module 412. As noted above, the user profile and dynamic user-related content and activities may be dynamically monitored and collected by the user content/activity monitor 112. In addition, each new user, upon signing-up to the content recommendation engine 102, may provide basic user profile through the user request processing unit 410. Thus, user profiles may be also obtained by the user characterization module 402 from the user profile archive 416 where profiles of all existing users are kept.

The modeling module 404 is configured to establish a model that maps from users to topics of interest based on the user and content feature information fed from the user characterization module 402. In this example, the model may be established based on a user feature matrix A representing user features with respect to the existing users and a content feature matrix B representing content features with respect to the existing users. The user feature and content feature database 406, 408 may store a larger amount of information related to user attributes, topics, and keywords, as compared with the user and content feature information used by the modeling module 404 to establishing or refining the model. As discussed, the information to be fed to the modeling module 404 may be selected in a manner to reduce the dimension of matrix A or matrix B in order to be computationally competitive. Such selected information may be the most relevant at the time of the selection. Due to the fact that interests or context of user's environment may change over time, other collected data are still stored so that when needed, certain information can be retrieved and used when, e.g., the model needs to be drastically refined. For example, over time, a user's interest may change. This may be observed when recommended content has not been selected by the user. In this case, topics or keywords associated with such unselected content may be removed from content feature matrix B and new interest may be retrieve from the archive to replace the staled interests. It is understood that the dimension of the content feature matrix B is usually reduced because of the large amount of keywords data. As to the user feature matrix A, whether the dimension reduction should be performed is a design choice made case by case.

The model, as described above, enables hybrid information query and content recommendation. In a hybrid query, a query can be based on any one of a user, a feature, or a document while the query result can also be any one of a user, a feature, or a document. For example, a user can provide a user name (query input) and queries for users (query result) who are similar in interests. A user can also provide a feature such as a phrase or a number of keywords (query input) and queries for users (query result) who contributed content containing such features. Query input may also be a document and ask for other similar documents (query result). As can be seen, such hybrid information query scheme provides a much more flexible and useful scheme for information search. It is noted that the model as described herein can be used to facilitate or enable such hybrid queries because the information contained in the model allows comprehensive matching in order to identify the query result sought by a hybrid query. As discussed, user to user matching based on interested topics or keywords may be achieved by identifying rows in content feature matrix B that are similar. That is, users corresponding to such rows have shared interests. On the other hand, if one is query about other users who have similar attributes, user to user matching may be performed by analyzing user feature matrix A on the similarity between the row representing the querying user and rows representing other users. This is also a mechanism that enables recommendations of content of interests for a new user. Whenever a new user signs up, the system may look for one or more "similar" users through the model and consider recommending content consumed or contributed by the "similar" users to the new user, as they likely share the same implicit interest on such content. That is, the present teaching is capable of inferring and/or deriving a user's implicit interests and preferences via, e.g., derivation by the nine-way query-result matching or propagation by social graph, to obtain user-related information based on, e.g., information related to other existing users.

In another example, if a querying user provides a document as input and asks for a similar document, then a document to document matching need to be carried out. This can also be facilitated by the model as disclosed herein so long as there is indices made from the topics or keywords identified in content feature matrix B that point to the actual documents under such topics. In this case, the input document may be first analyzed and features, e.g., keywords or topics, are identified. Through such topics and by tracing by following the indices, similar documents can be identified. In the same fashion, if a document is provided via a query and the request is to identify other users who are interested in similar documents, rows in content feature matrix B that include similar topics or keywords can be identified and users corresponding to such rows can be identified as the query response.

The user request processing unit 410 is responsible for collecting a new or existing user's basic attributes when receiving a request to recommend content to the user (e.g., a new user first time signs-up to the content recommendation engine 102, an existing user signs in the content recommendation engine 102, or the content portal 104 sends a request to the content recommendation engine 102). The user request processing unit 410 in this example may perform attribute preprocessing and normalization operations to generate a user feature vector for each user when they first time sign up or every time when they update their attributes. For example, for certain user attributes, the user request processing unit 410 may convert it to appropriate categorical feature(s) based on the correlation of its values with content interests. In one example, for "city" attribute, features such as city tiers, Internet penetration rate of a city, etc., may be derived. The user profiles may be saved in the user profile archive 416 for future use.

The topic estimation module 412 is configured to provide estimated topics of interest for new or existing users based on the recommendation model from the modeling model 404 and the user profile (e.g., feature vector) obtained from the user request processing unit 410. The estimated topics may be provided to the content recommendation module 414 to determine content that the user is most likely interested in. In addition, the estimated topics may be continusily fed back to the modeling module 404 for model refinement.

Figure 4B:
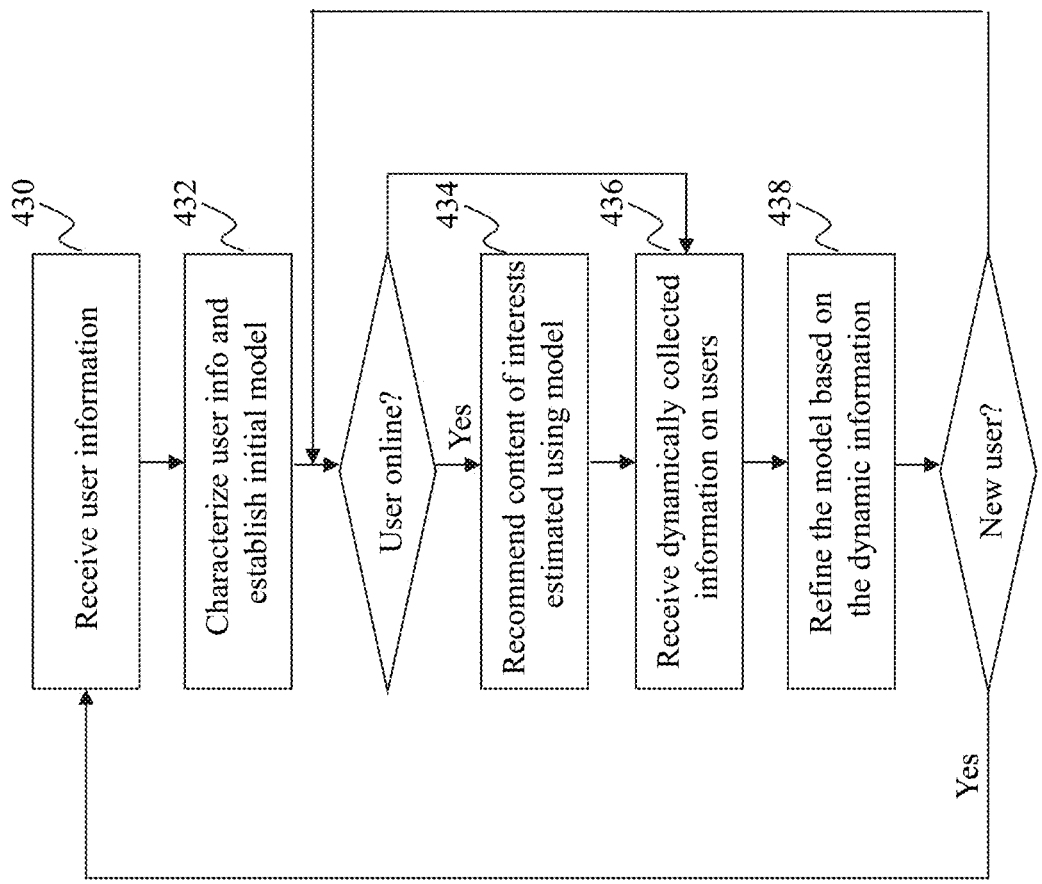
FIG. 4(b) is a flowchart of an exemplary process of the content recommendation engine, according to an embodiment of the present teaching.

FIG. 4(b) is a flowchart of an exemplary process of the content recommendation engine 102, according to an embodiment of the present teaching. At block 430, user information, such as user profile, user-related content, and activities, is received by the content recommendation engine 102. At block 432, the received user information is characterized by the user characterization module 402, and the characterized user information (e.g., represented as the content feature matrix B and user feature matrix A) is used to establish an initial recommendation model by the modeling unit 404. At block 434, the model may be used by the topic estimation module 412 in conjunction with the content recommendation module 414 to recommend content for any online existing user (currently signing-in the content recommendation engine 102). At block 436, the content recommendation engine 102 may continuously receive dynamically collected information of the existing users, and, at block 438, refine the initial recommendation model based on the dynamically updated information of the existing user. Once a new user signs up to the content recommendation engine 102, the information of the new user is collected and characterized at blocks 430 in order to recommend content of interest to the new user at block 453. The information of the new user may be also integrated into the recommendation model by appending the new user's features and topics of interest to the existing user feature and content feature matrices in order to continuously enhance the recommendation model.

Figure 5A:
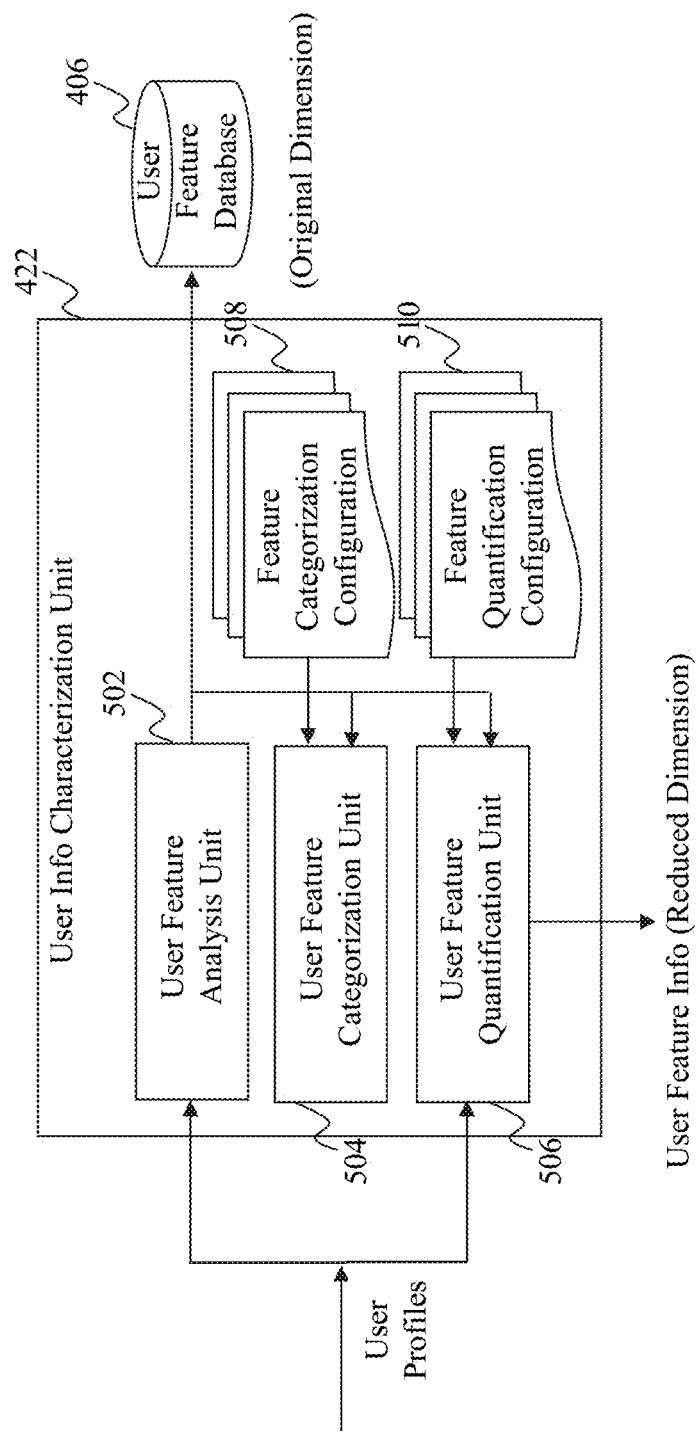
FIG. 5(a) is a system diagram for an exemplary user information characterization unit of the user characterization module, according to an embodiment of the present teaching.

FIG. 5(a) is a system diagram for an exemplary user information characterization unit 422 of the user characterization module 402, according to an embodiment of the present teaching. The user information characterization unit 422 may include a user feature analysis unit 502, a user feature categorization unit 504, and a user feature quantification unit 506. The user feature analysis unit 502 is responsible for extracting basic user features from received user profiles. The features extracted by the user feature analysis unit 502 may be represented as a user feature vector for each user, and all the user feature vectors may be directly saved in the user feature database 406 without any dimension reduction process. In other words, the user feature database 406 in this example stores user feature vectors in their original dimensions.

The user information characterization unit 422 generates user feature information, which may be represented as an m×n matrix A, with rows corresponding to users and columns corresponding to user features in a reduced dimension. Optionally, to reduce computational complexity, the dimension of user feature vectors in the matrix A may be reduced by the user feature categorization unit 504 and user feature quantification unit 506 compared with the original dimension of user feature vectors stored in the user feature database 406.

The user feature categorization unit 504 is configured to derive categorical features for each user base on correlation of its values with content interests, i.e., predefined feature categorization configuration 508. In one example, for "city" attribute, features such as whether it is from first-tier cities such as Beijing, Shanghai, the Internet penetration rate of that city, etc., may be derived by the user feature categorization unit 504. In another example, for "university/department" attribute, derived features may include whether the department is technology, art, or science, the tier of the university, etc. The user feature quantification unit 506 is configured to quantify each feature into value ranges according to data analysis, i.e., predefined feature quantification configuration 510. In one example, for "birthday" attribute, it may be quantified by the user feature quantification unit 506 into predefined age groups, such as 20+, 40+, 60+, etc. Also, "birthday" attribute may be quantified to derive two other features: constellation and Chinese Zodiac. Based on astrology and numerology, features such as a user's personality may be interred based on his/her constellation and Chinese Zodiac, which may be further combined with other features to infer the user's possible social roles and topics of interest. In still another example, statistical data-driven approaches may be applied to feature quantification. For example, topics may be considered as labels and attributes may be considered in their real values as features. The effective feature quantification then may be obtained from the data according to the cut-off values of each attribute in a decision tree classifier.

Figure 5B:
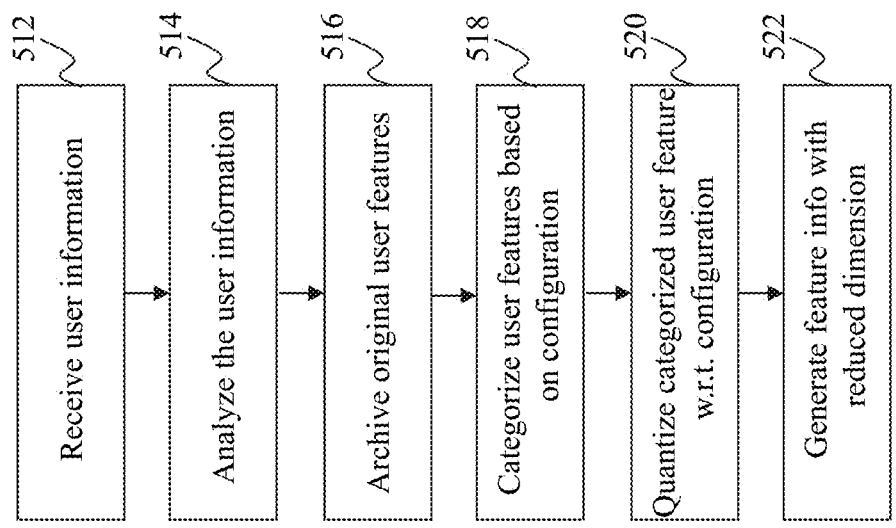
FIG. 5(b) is a flowchart of an exemplary process of the user information characterization unit, according to an embodiment of the present teaching.

FIG. 5(b) is a flowchart of an exemplary process of the user information characterization unit 422, according to an embodiment of the present teaching. Starting from block 512, user information, such as user profiles, is received by the user information characterization unit 422. The user information is then analyzed at block 514 by the user feature analysis unit 502 to extract original user features. The original user features may be archived in the feature database 406 at block 516 for future use, such as model refinement. Proceeding to block 518, user features may be categorized to derive features based on predefined feature categorization configuration. At block 520, categorical user features may be further quantified with respect to predefined feature quantification configuration to reduce the dimension of the feature vectors. Eventually, at block 522, user feature information with a reduced dimension is generated by the user information characterization unit 422.

Figure 5C:
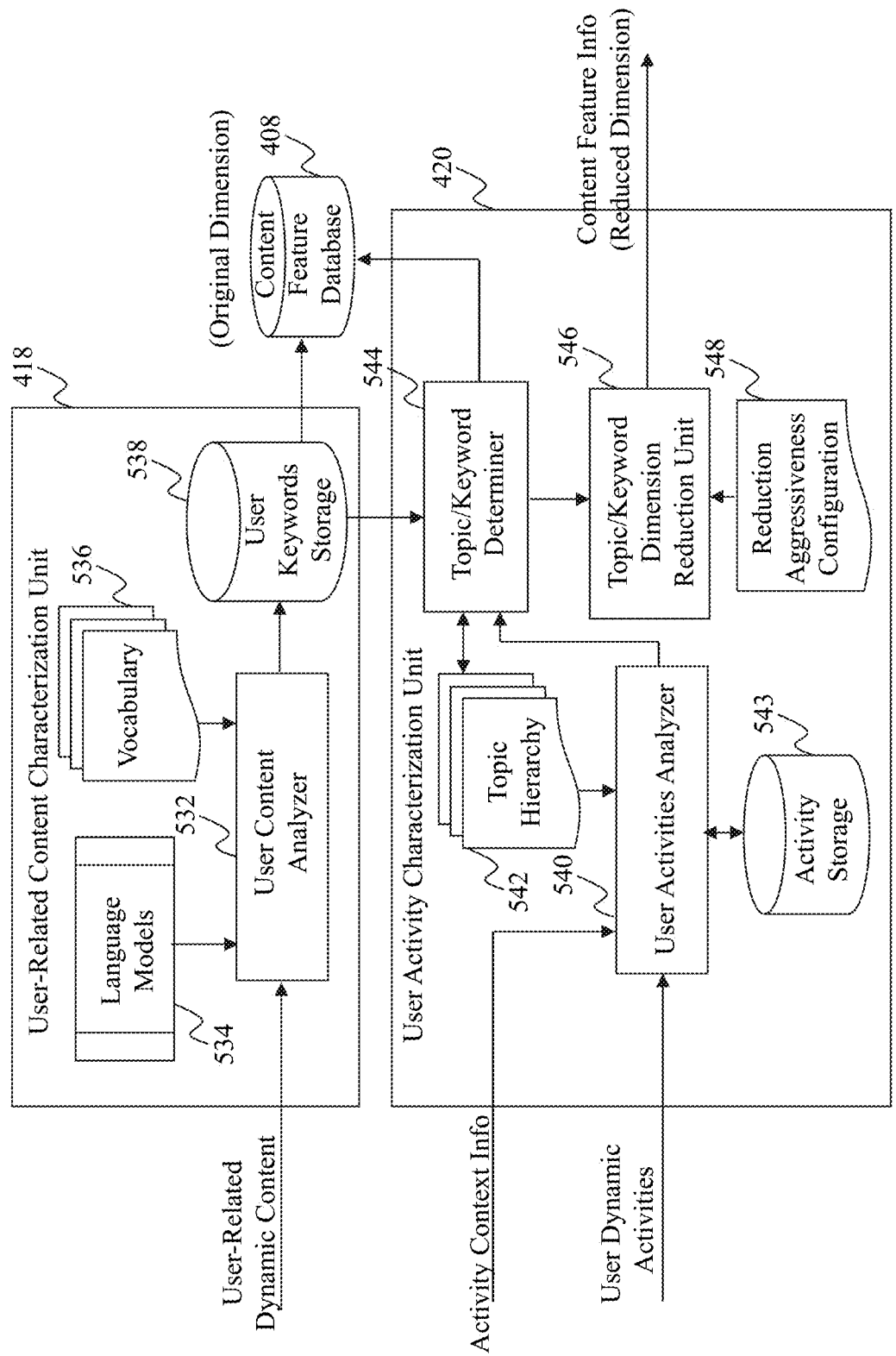
FIG. 5(c) is a system diagram for an exemplary user-related content characterization unit and user activity characterization unit of the user characterization module, according to an embodiment of the present teaching.

FIG. 5(c) is a system diagram for an exemplary user-related content characterization unit 418 and user activity characterization unit 420 of the user characterization module 402, according to an embodiment of the present teaching. The user-related content characterization unit 418 and user activity characterization unit 420 are responsible for generating content feature information that indicates each user's interest profile. The content feature information may be represented as an m×h content feature matrix B, with rows corresponding to users and columns corresponding to topics/categories and keywords in a reduced dimension.

The user-related content characterization unit 418 may include a user content analyzer 532 responsible for performing keywords selection from the user-related dynamic content based on language models 534 and vocabulary 536 and storing the extracted keywords in a user keywords storage 538. The keywords may be eventually stored in the content feature database 408 as part of the content feature vector for each user. As noted above, the user-related content may be any content consumed or contributed by the user. The user content analyzer 532 may apply any known language models to extract keywords and/or identify topics of interest from the content, e.g., by feature selection methods in text classification, such as document frequency (how many documents in the corpus a word occurs in), mutual information, information gain, chi-square, etc. All those feature selection methods may help selecting of the most indicative keywords or key phrases from various candidate keywords with respect to any predefined category (topic of interest) from the user-related dynamic content.

The user activity characterization unit 420 may include a user activity analyzer 540 responsible for analyzing the user's dynamic activities based on activity context information and topic hierarchy 542. Optionally, all the collected user activities may be stored in activity storage 543 for future use. The activity context information indicates the context of each user activity, such as the time when the activity occurs, the site where the activity happens, etc., which may have different weights when different user activities are aggregated. The user activity characterization unit 420 may also include a topic/keyword determiner 544 configured to determine content features, such as topics of interest or keywords, based on and the user activities, the extracted keywords from the user keywords storage 538, and the topic hierarchy 542. In one example, the activities and keywords may be classified under predefined topics in terms of the same taxonomy in the topic hierarchy 542 by any known classifier. For example, activities and keywords related to the same user may be aggregated through weighted linear combination into a single topic vector. In addition to explicit interests, as noted above, topics of interest for each user may be also inferred as implicit interests by topic propagation methods in the social network setting. The determined topics of interest may be represented as a real-value vector (i.e., a vector of weights with respect to keywords and topics) for each user and stored in the content feature database 408 in their original dimensions. In order to reduce the dimension of topics in the content feature matrix B, a topic/keyword dimension reduction unit 546 may be applied in conjunction with predefined reduction aggressiveness configuration 548. In one example, known feature selection methods in text classification may be applied to calculate scores for each <topic, keyword> pair. The scores are then used to rank all the keywords for each topic. By setting a threshold on the scores or the number of keywords selected for each topic, the dimension of the topic vectors may be reduced. For example, keywords such as "football," "basketball," "Michael Jordan," "NBA" may be considered as the most indicative keywords for "sports" topic and thus, are included in the content feature matrix B.

Figure 5D:
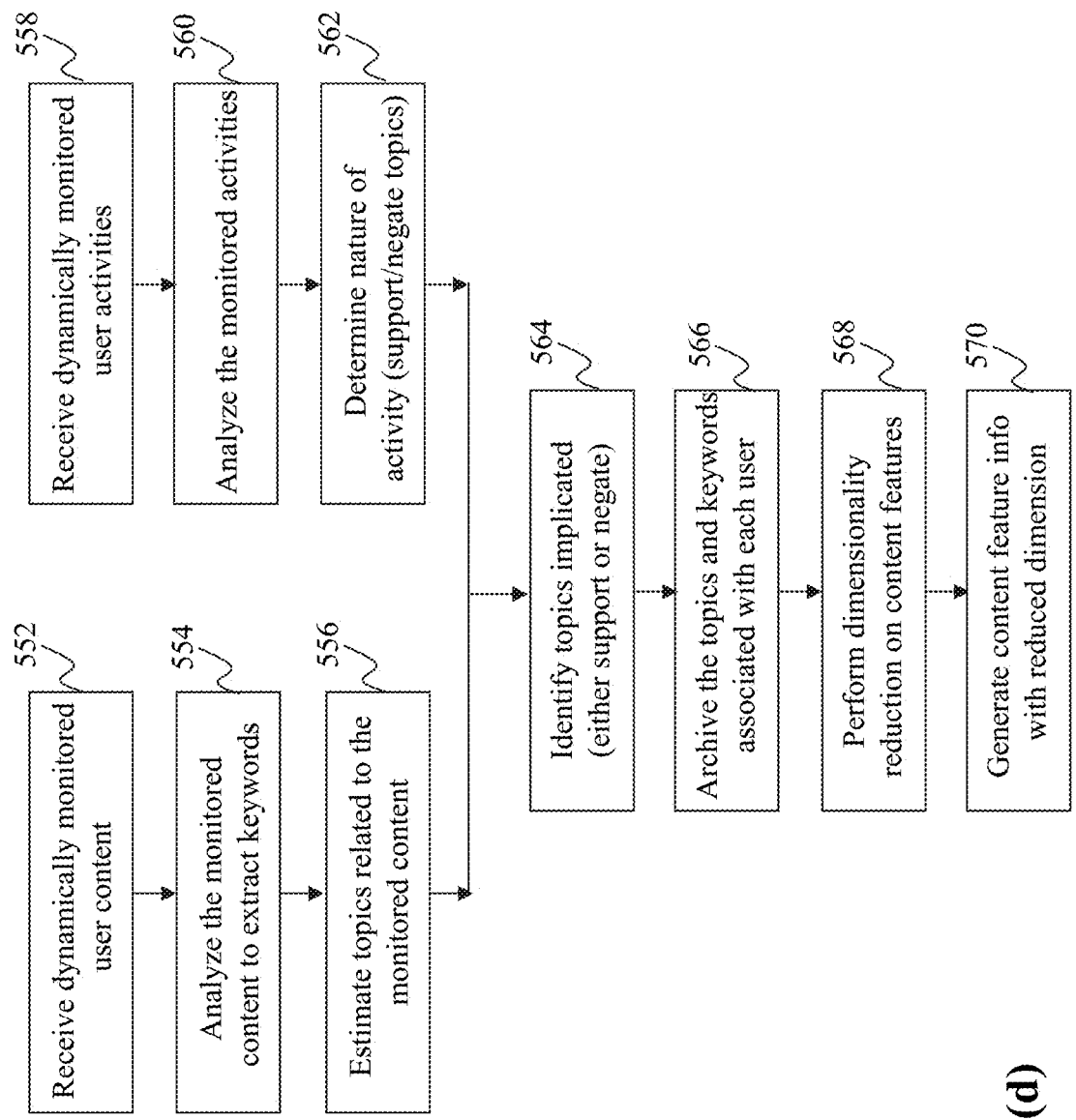
FIG. 5(d) is a flowchart of an exemplary process of the user-related content characterization unit and user activity characterization unit, according to an embodiment of the present teaching.

FIG. 5(d) is a flowchart of an exemplary process of the user-related content characterization unit 418 and user activity characterization unit 420, according to an embodiment of the present teaching. At block 552, dynamic user-related content is received by the user-related content characterization unit 418. At block 554, the received content is analyzed to extract keywords based on language models and vocabulary. Topics of interest related to the received dynamic content are then estimated at block 556 by, for example, statistical classifiers. At block 558, dynamic user activities are also received by the user activity characterization unit 420. The received activities are analyzed at block 560, and their natures, such as whether an activity supports or negates a topic, are determined at block 562. Implicit topics of interest (e.g., supporting or negating a topic) may be identified at block 564 based on the estimated topics and determined natures of activities. Proceeding to block 566, all the identified topics associated with each user, whether explicit or implicit, and the keywords may be archived in the content feature database 408 as content feature for each user. At block 568, dimensionality reduction may be performed to reduce the dimension of content features in the content feature matrix B. Eventually, at block 570, content feature information with a reduced dimension is generated by the user-related content characterization unit 418 and user activity characterization unit 420.

Figure 6A:
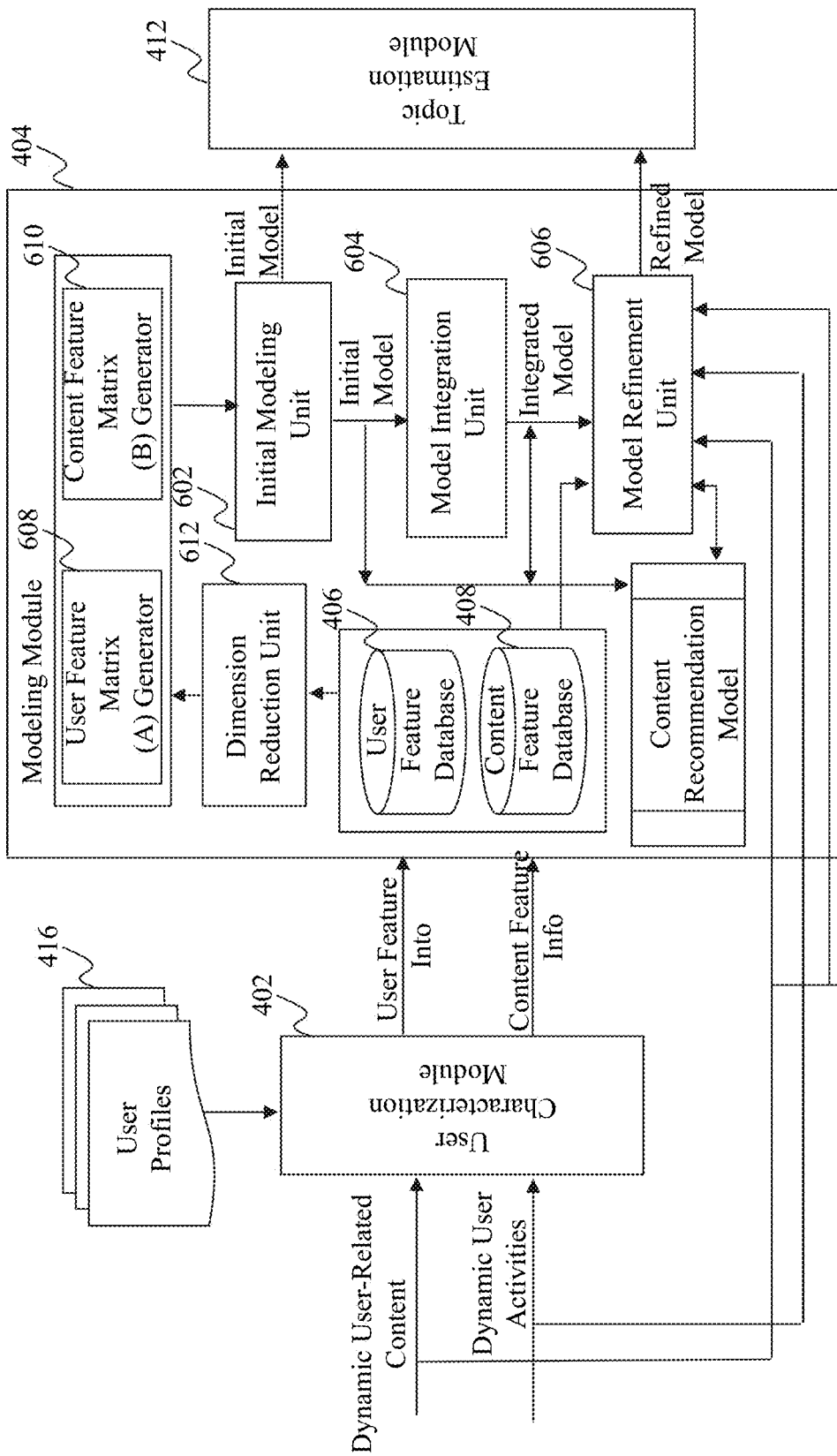
FIG. 6(a) is a system diagram for an exemplary modeling module of the content recommendation engine, according to an embodiment of the present teaching.

FIG. 6(a) is a system diagram for an exemplary modeling module 404 of the content recommendation engine 102, according to an embodiment of the present teaching. In this example, the modeling module 404 includes an initial modeling unit 602, a model integration unit 604, and a model refinement unit 606. The initial modeling unit 602 is configured to provide an initial model to the topic estimation module 412 based the user feature matrix A and content feature matrix B of the existing users. In this example, the modeling module 404 further includes a user feature matrix generator 608 and a content feature matrix generator 610. As noted above, the user characterization module 402 may be responsible for providing the user feature matrix A and content feature matrix B in the user feature information and content feature information, respectively. In this example, a dimension reduction unit 612 may be employed in the modeling module 404 to reduce dimensions of the user feature vectors and content feature vectors that are stored in the user feature database 406 and content feature database 408, respectively, in their original dimensions. The user feature matrix generator 608 and content feature matrix generator 610 then combine user feature vectors and content feature vectors for all existing users to generate the user feature matrix A and content feature matrix B, respectively.

The model integration unit 604 is configured to generate an integrated model by continuously appending the information of each new user (e.g., new user attributes, estimated topics of interest) to the user and content feature matrices of the existing model. Given that online activities continuous occur and change, the model refinement unit 606 is responsible for dynamically refining the content recommendation model based on dynamic user-related content and activities and characterized user and content features. In addition, the discrepancy between the estimated topics and the actual user selected content may be used by the model refinement unit 606 for adjusting the current recommendation model to improve prediction accuracy. The up-to-date model may be always provided to the topic estimation module 412 for topics stimulation.

Figure 6B:
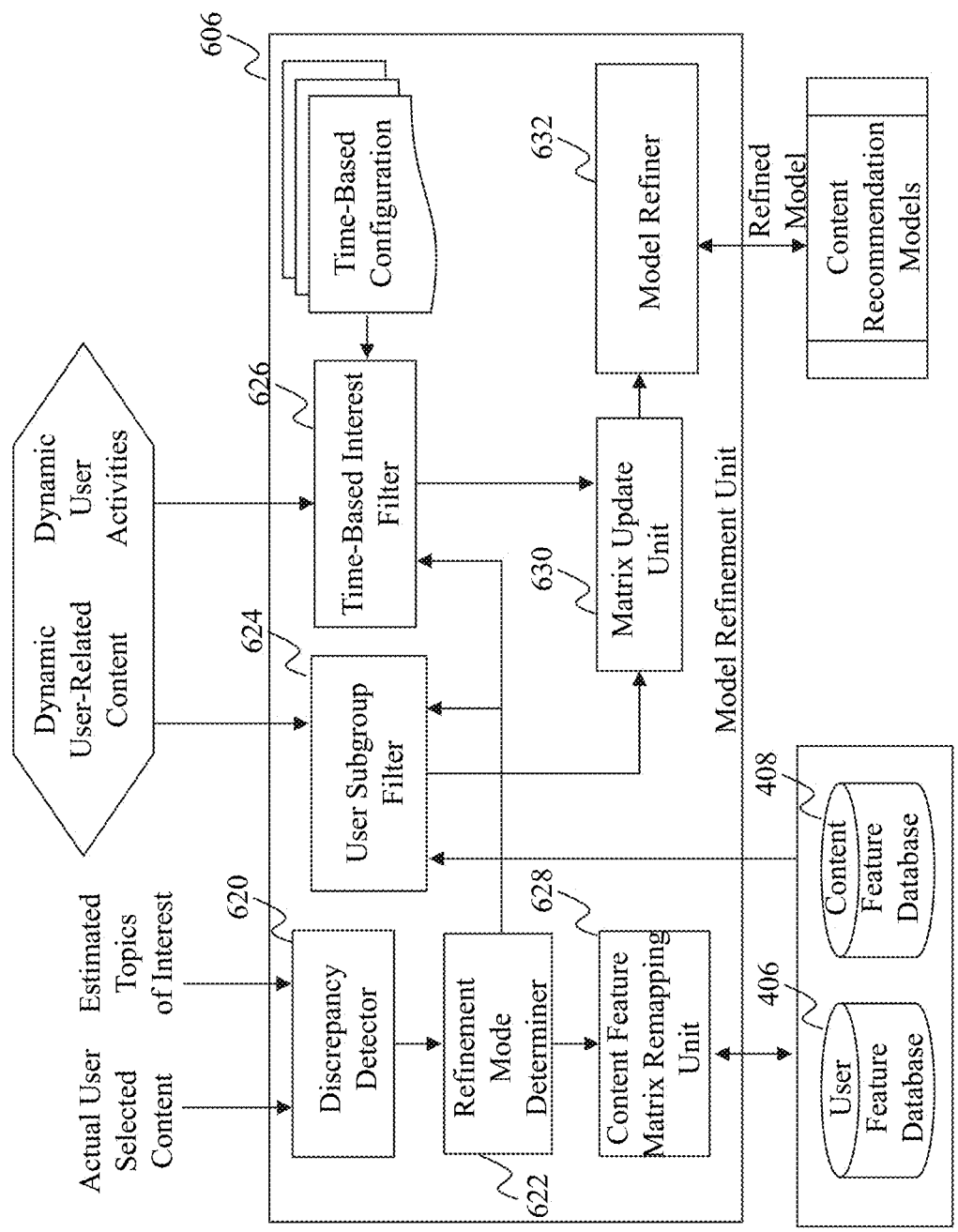
FIG. 6(b) is a system diagram for an exemplary model refinement unit of the modeling module, according to an embodiment of the present teaching.

FIG. 6(b) is a system diagram for an exemplary model refinement unit 606 of the modeling module 404, according to an embodiment of the present teaching. In this example, the model refinement unit 606 includes a discrepancy detector 620, a refinement mode determiner 622, a user subgroup filter 624, a time-based interest filter 626, a content feature matrix remapping unit 628, a matrix update unit 630, and a model refiner 632. As noted above, discrepancy between the estimated topics and the actual user selected content may be detected and analyzed by the discrepancy detector 620. Depending on the degree of discrepancy, the refinement mode determiner 622 is responsible for deciding a mode in which the model refinement will be conducted. In one example, if the discrepancy is below a threshold value, a gradual refinement mode may be selected. The matrix update unit 630 then updates the user feature matrix A and content feature matrix B based on the dynamically monitored user information. In another example, if the discrepancy is above a threshold value, which means the estimated topics of interest are not what the user expects, the content feature matrix remapping unit 628 may be applied to update the content feature matrix B by swapping the estimated topics out of the matrix B.

Figure 6C:
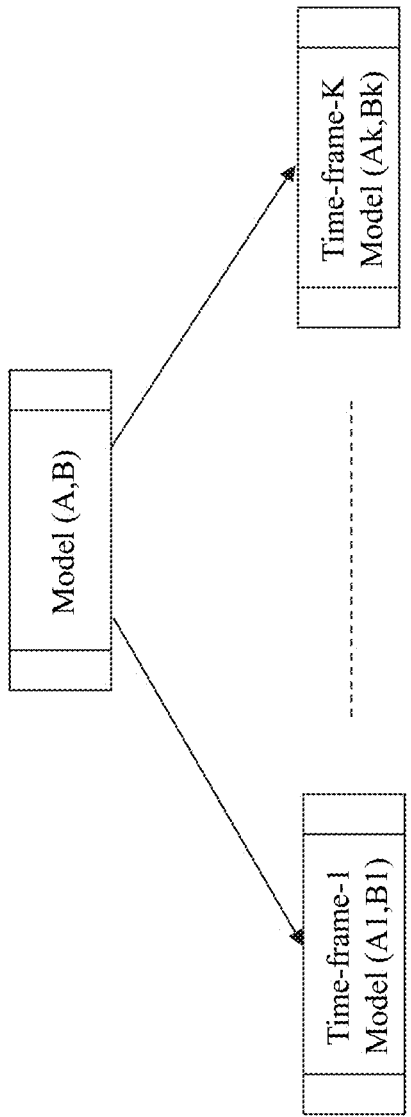
FIGS. 6(c) and 6(d) are depictions of hierarchical models, according to different embodiments of the present teaching.
Figure 6D:
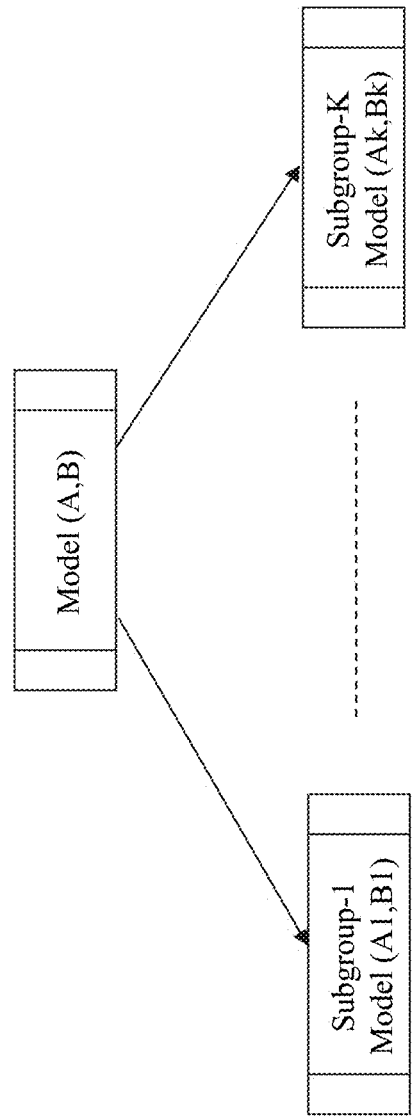

In still another example, hierarchical models with sub-models may be applied to further refine the content recommendation model. Referring now to FIG. 6(c), hierarchical models based on different time frames may be applied by the time-based interest filter 626 to collect only user-related content and activities that fit into a specific time frame for each user. For example, a user on week days and weekend/evening times may have different interested topics when online. Sub-models for each user may be divided into such time frames and used accordingly depending on the time at which a recommendation needs to be made. Similarly, in FIG. 6(d), sub-models based on user subgroups may be applied by the user subgroup filter 624 to collect only content and activities of users in a specific subgroup. More similar users may be grouped together to more precisely model the interests of this subgroup. Referring back to FIG. 6(b), the hierarchical models applied by the user subgroup filter 624 or the time-based interest filter 626 may be fed into the matrix update unit 630 to cause the model refiner 632 to adjust the content recommendation models. For example, the initial model may be divided into sub-models with respect to time or user as noted above. The model refiner 632 may further generate sets of matrices A's and B's for the sub-models and establish recommendation models using the new matrices A's and B's.

Figure 6E:
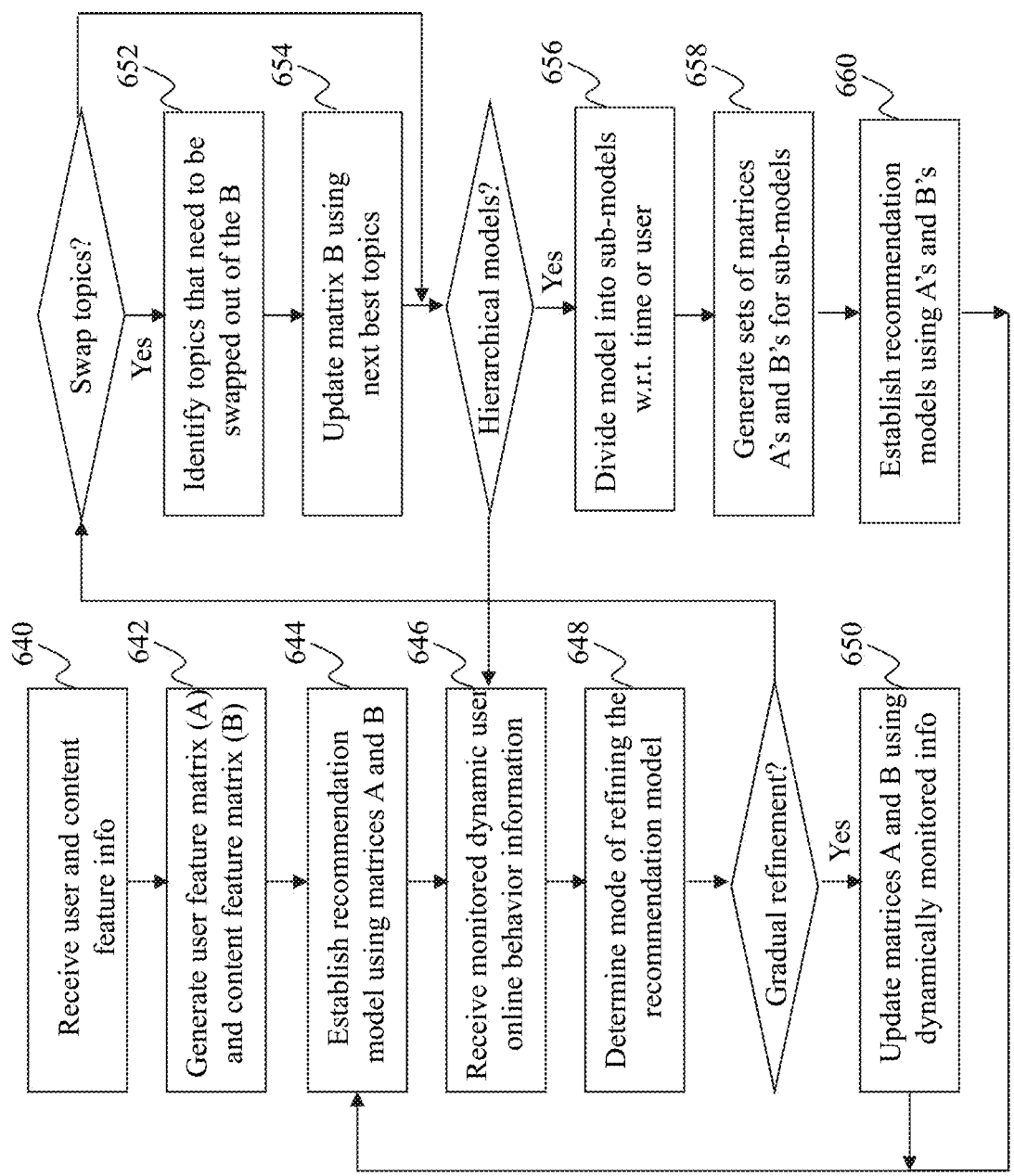
FIG. 6(e) is a flowchart of an exemplary process of the modeling module, according to an embodiment of the present teaching.

FIG. 6(e) is a flowchart of an exemplary process of the modeling module 404, according to an embodiment of the present teaching. Starting from block 640, user feature information and content feature information are received by the modeling module 404. At block 642, the user feature matrix A and content feature matrix B are generated based on the received user feature information and content feature information (e.g., topics, keywords), respectively. A recommendation model is then established at block 644 using the matrices A and B. Proceeding to block 646, dynamic user online behavior information such as dynamic user-related content and user activities are continuously monitored and received by the model refinement unit 606. At block 648, the mode for refining the recommendation model is determined. If a gradual refinement mode is chosen, at block 650, matrices A and B are updated by the model refinement unit 606 using the dynamically updated user information. If estimated topics of interest provided by the current recommendation model are deemed to be undesired at block 652, the content feature matrix B may be updated using the next-best topics at block 654. Otherwise, a hierarchical model may be applied to adjust the current recommendation model. At block 656, the current recommendation model may be divided into sub-models with respect to time or user. New sets of user feature matrices A's and content feature matrices B's may be generated at block 658 for the divided sub-models. Eventually, at block 660, a refined recommendation model may be established using the new sets of user feature matrices A's and content feature matrices B's.

Figure 7A:
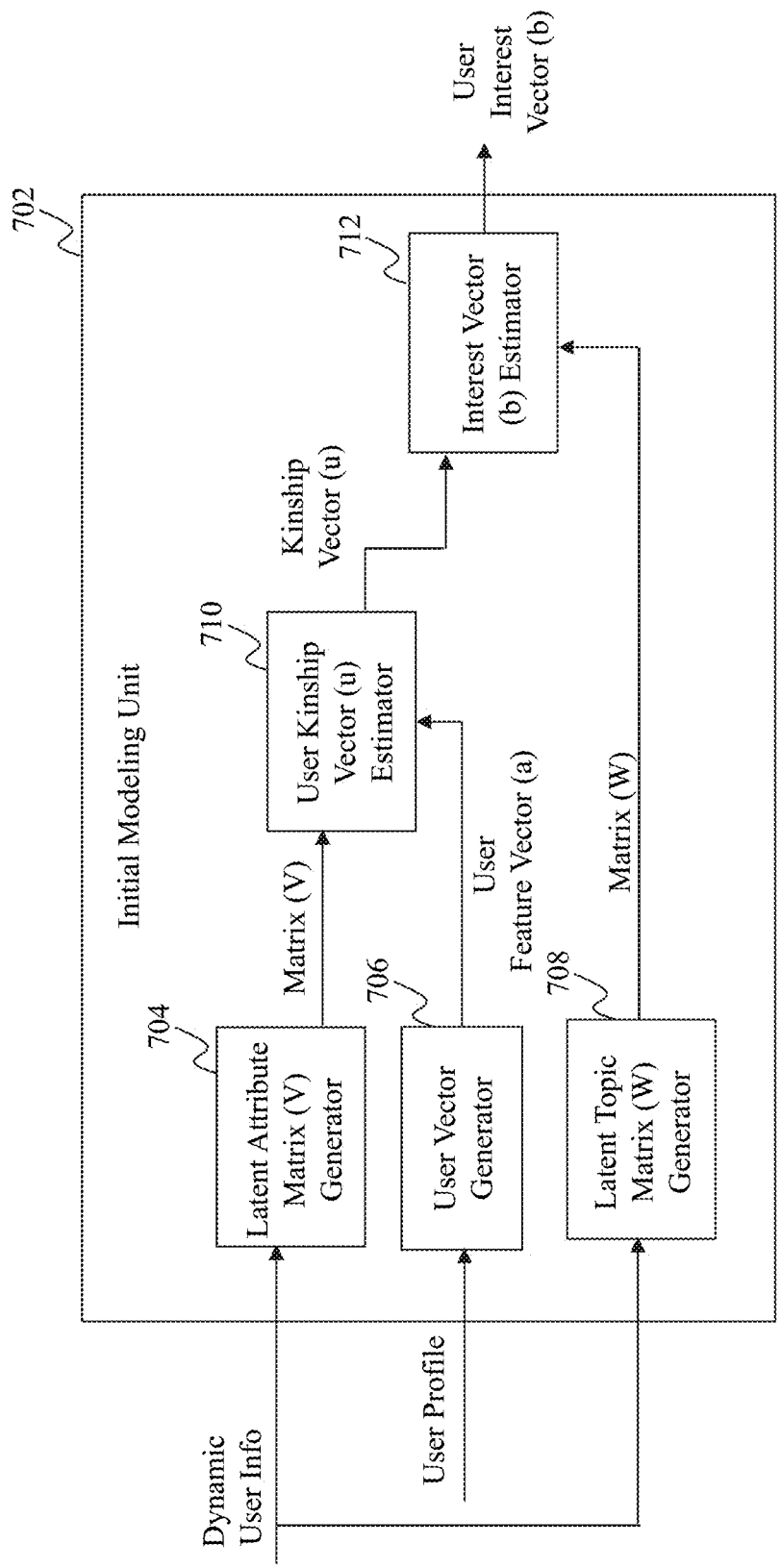
FIG. 7(a) is a system diagram for one example of an initial modeling unit of the modeling module, according to an embodiment of the present teaching.

FIG. 7(a) is a system diagram for one example of an initial modeling unit 702 of the modeling module 404, according to an embodiment of the present teaching. The initial modeling unit 702 includes a latent attribute matrix generator 704, a user vector generator 706, a latent topic matrix generator 708, a user kinship vector estimator 710, and an interest vector estimator 712. The latent attribute matrix generator 704 and latent topic matrix generator 708 are responsible for generating and updating latent matrices V and W, respectively, based on dynamic user behavior information. In this example, user features in the feature matrix A and content features in the content feature matrix B may be co-clustered into parallel topics/clusters. For example, matrix factorization (e.g., singular value decomposition) may be applied to both matrices A and B with a shared user profile matrix U. That is, A=UV and B=UW, where U is a m×p user latent kinship matrix (i.e., each row corresponds to the latent profile of a particular user, indicating the interests/kinships of the user to each topic or cluster), V is a p×n latent attribute matrix (i.e., each column corresponds to a topic or cluster center of the user features), W is a p×h latent topic matrix (i.e., each column corresponds to a topic or cluster center of the content features), and p is a predefined number (i.e., number of topics or clusters). In addition, matrices V and W may be updated in batch frequently (e.g., per week or per 10K user increments) in a recurrent manner when more user information becomes available (e.g., new users are signed up).

The user kinship estimator 710 is configured to extract a kinship vector u for a user to each topic of interest based on the latent attribute matrix V and the information related to the current user. In this example, fold-in inference may be applied by the user kinship vector estimator 710 at the online serving stage, for example when a new user signs up with basic attributes. The user vector generator 706 may generate a user feature vector a by analyzing the user's profile. The user kinship vector estimator 710 then extracts the kinship vector u for the user by solving u from min $\|a-uV\|^2$ with V fixed. The interest vector estimator 712 is then responsible for calculating the user interest vector b by applying b=uW. The calculated user interest vector b may be used to retrieve personally relevant content for the user based on the similarities between users and content in the p-dimensional latent space.

Figure 7B:
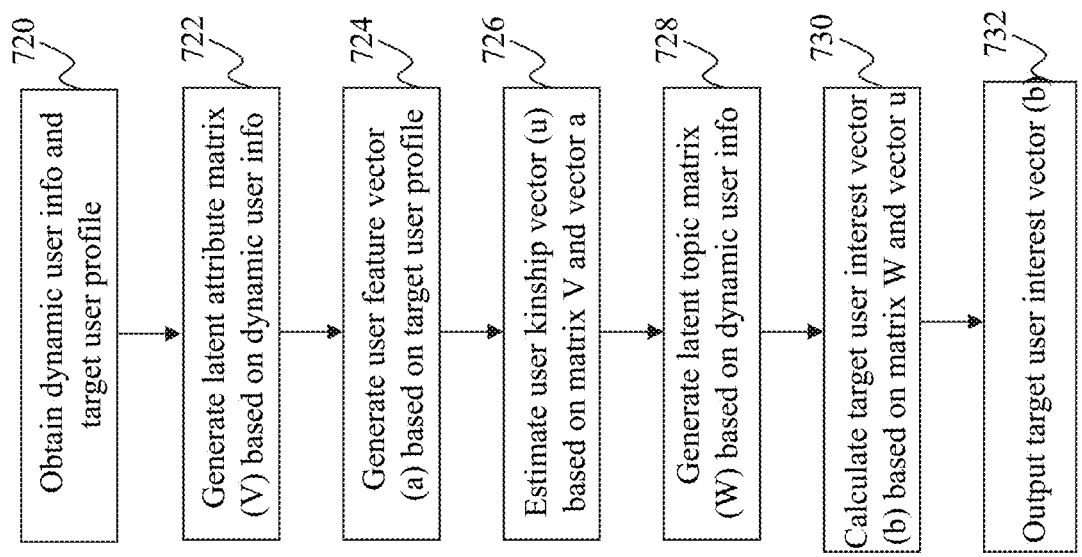
FIG. 7(b) is a flowchart of an exemplary process of the initial modeling unit, according to an embodiment of the present teaching.

FIG. 7(b) is a flowchart of an exemplary process of the initial modeling unit 702, according to an embodiment of the present teaching. Starting from block 720, dynamic user information of the existing users and profile of a target user is obtained. At block 722, a latent attribute matrix V is generated based on the dynamic user information of the existing users. A user feature vector a is then generated at block 724 based on the target user's profile, such as the new user's basic attributes. At block 726, a user kinship vector u for the target user is estimated based on both the latent attribute matrix V and the target user feature vector a using methods such as fold-in inference. Moving to block 728, a latent topic matrix W is generated based on the dynamic user information of the existing users. A user interest vector b for the target user is calculated, at block 730, based on both the latent topic matrix W and the estimated target user kinship vector u. Eventually, at block 732, the target user interest vector b is outputted for retrieving recommended content for the target user.

Figure 8A:
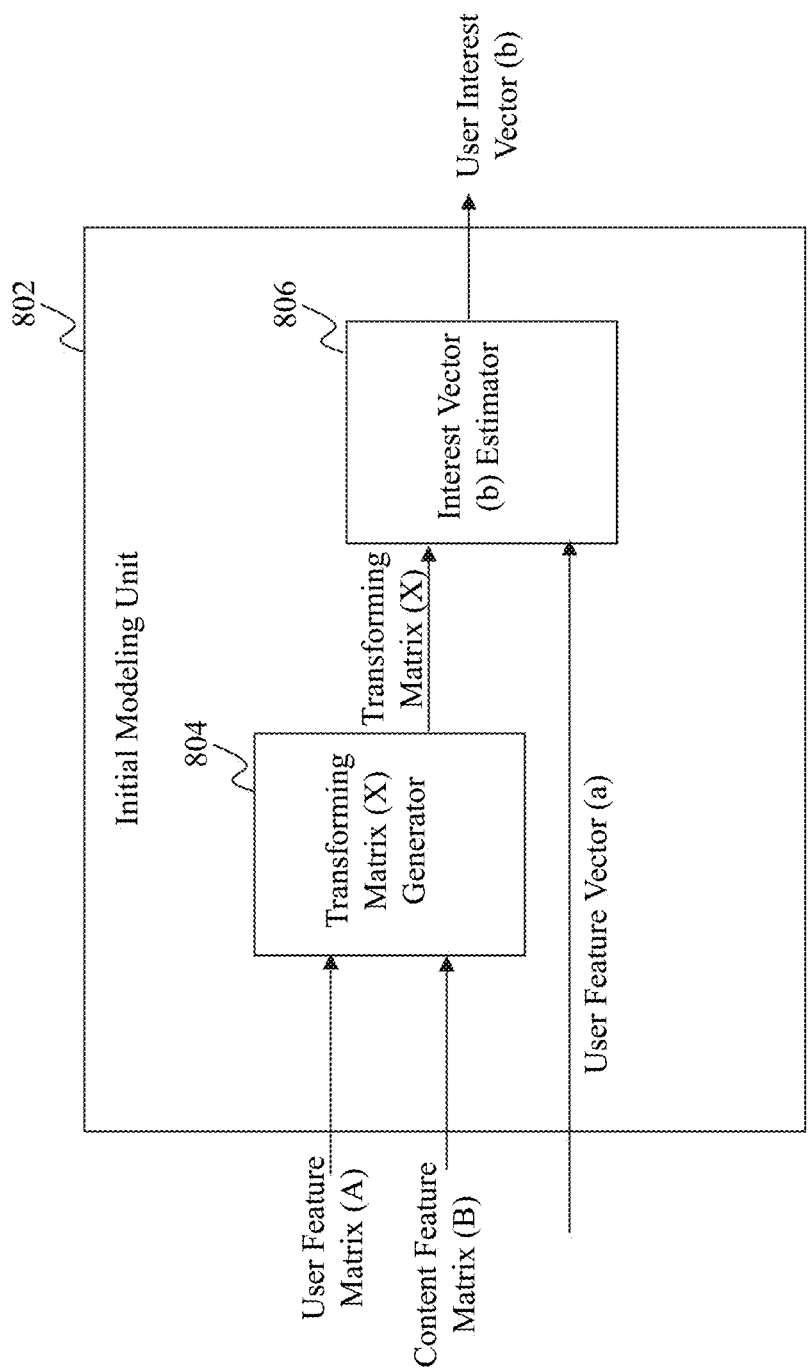
FIG. 8(a) is a system diagram for another example of the initial modeling unit of the modeling module, according to an embodiment of the present teaching.

FIG. 8(a) is a system diagram for one example of an initial modeling unit 802 of the modeling module 404, according to an embodiment of the present teaching. The initial modeling unit 802 includes a transforming matrix generator 804 and a interest vector estimator 806. The transforming matrix generator 804 is configured to calculate an n×h transforming matrix X representing a transformation from the user feature matrix A to the content feature matrix B of the existing users. For example, standard numerical computing methods, such as decision tree, standard regression, classification or ranking algorithm, may be applied to calculate X (AX=B). To handle bias, one column of "1" may be added to matrix A, and one corresponding row of "1" may be added to matrix X. At the online serving stage, for example when a new user signs up with user feature vector a or when an existing user updates its attributes, the interest vector estimator 806 is responsible for calculating the interest vector b for the user by multiplying b with X. The interest vector b for the user may be served as query to the content recommendation module 414 for personalized recommendation.

Figure 8B:
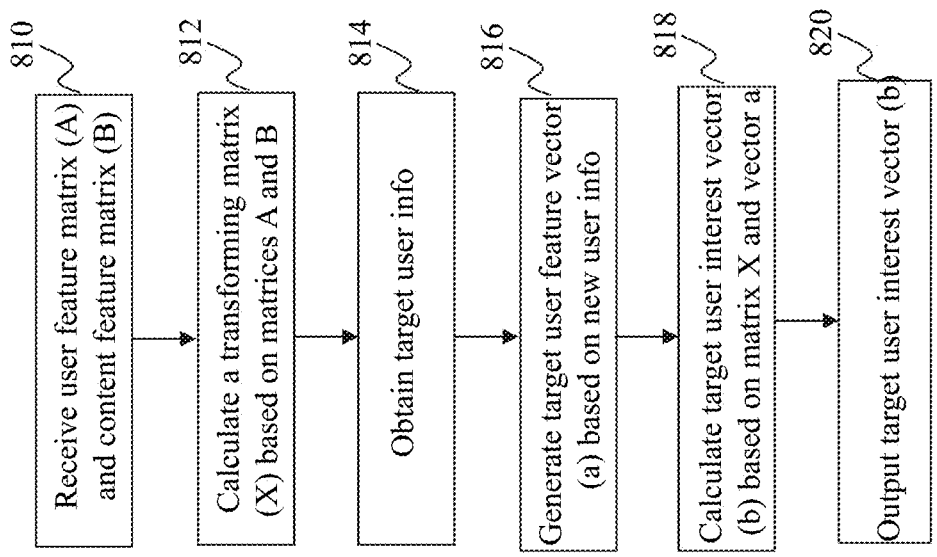
FIG. 8(b) is a flowchart of an exemplary process of the initial modeling unit, according to an embodiment of the present teaching.

FIG. 8(b) is a flowchart of an exemplary process of the initial modeling unit 802, according to an embodiment of the present teaching. Starting at block 810, the user feature matrix A and content feature matrix B are received by the initial modeling unit 802. At block 812, a transforming matrix X is learned based on matrices A and B by standard numerical computing methods. The transforming matrix X is the mapping between the user feature space and content feature space. Moving to block 816, a target user feature vector a is generated based on the target user's profile obtained at block 814. At block 818, a target user interest vector b is calculated based on the transforming matrix X and the target user feature vector a. Eventual, at block 820, the target user interest vector b is outputted as a query to the content recommendation module 414 for personalized recommendation.

Figure 9A:
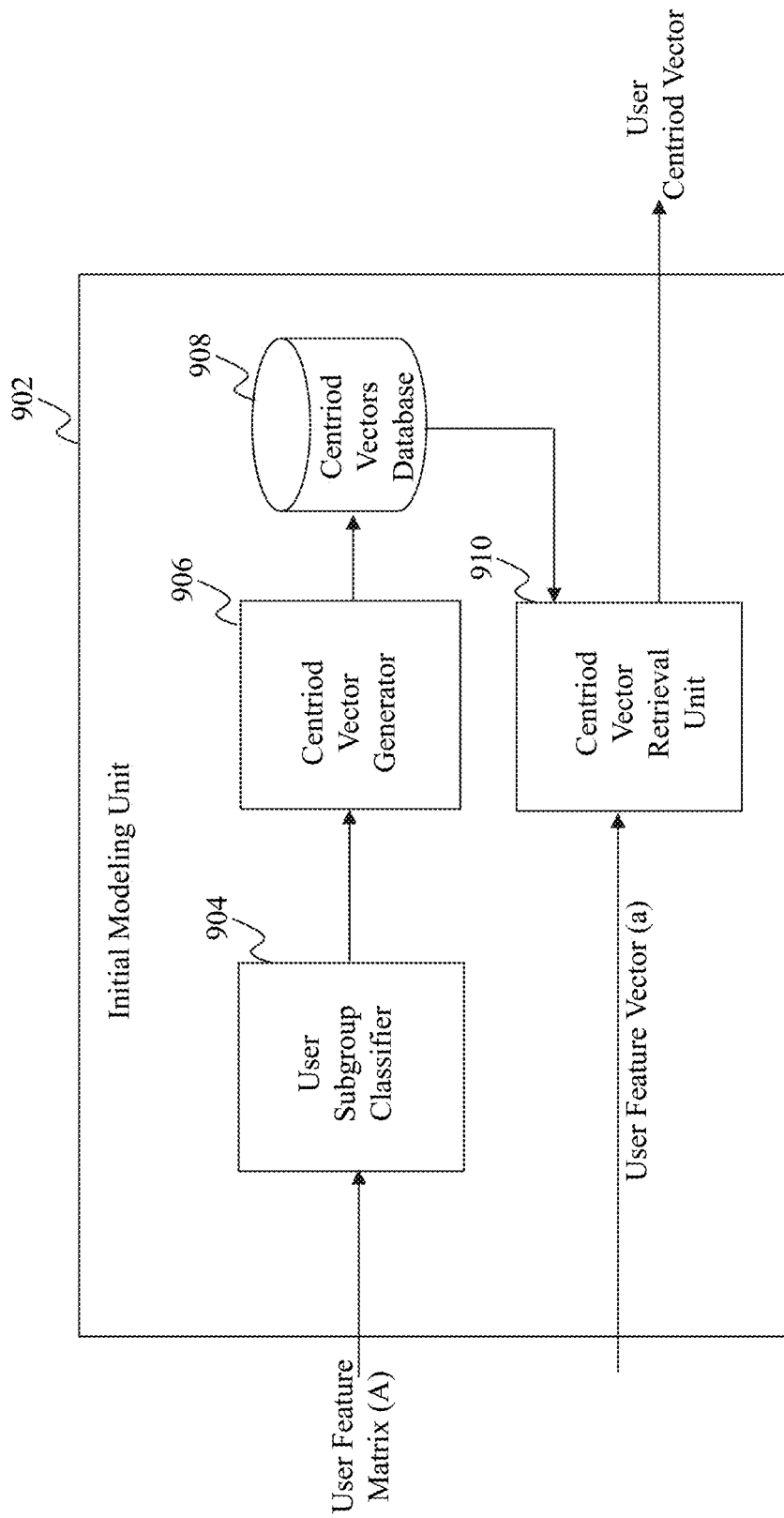
FIG. 9(a) is a system diagram for still another example of the initial modeling unit of the modeling module, according to an embodiment of the present teaching.
Figure 9B:
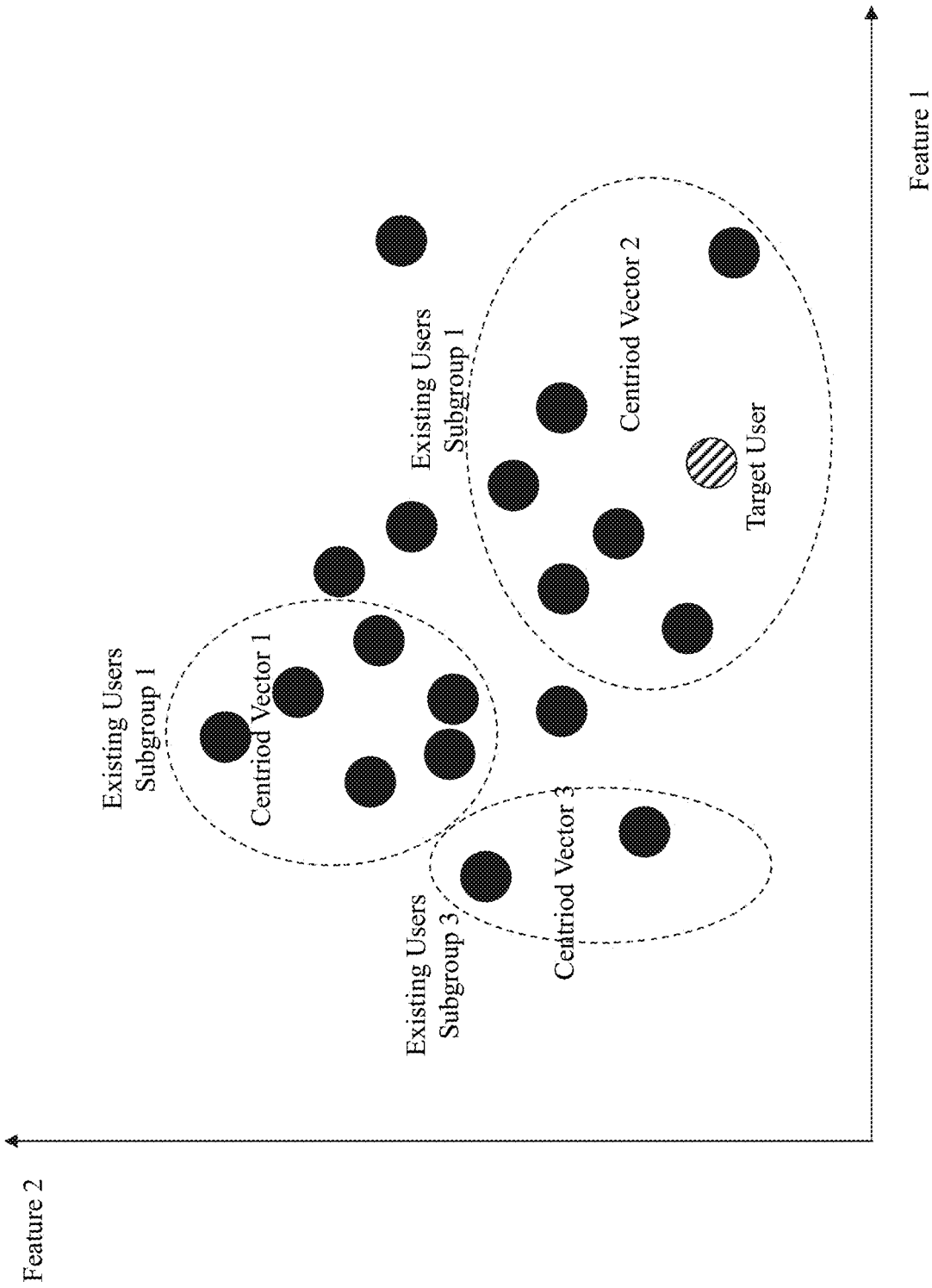
FIG. 9(b) is a depiction of group centroid used for establishing initial model for a new user, according to an embodiment of the present teaching.

FIG. 9(a) is a system diagram for one example of an initial modeling unit 902 of the modeling module 404, according to an embodiment of the present teaching. The initial modeling unit 902 includes a user subgroup classifier 904, a centroid vector generator 906, a centroid vector database 908, and a centroid vector retrieval unit 910. For each possible value (or value segment) of a feature or possible value conjunctions of multiple features, the user subgroup classifier 904 is responsible for dividing users into subgroups based on their content vectors. The centroid vector generator 906 then uses the centroid of those content vectors to profile the interests of the existing users who have the corresponding features. The centroid vector generator 906 also stores <key, value> pairs in the centroid vector database 908 with key being the value (value segment) of a feature or the conjunctions of multiple features, and value being the corresponding centroid vector. At the online serving stage, for example when a new user signs up with basic features or when an existing user updates its attributes, the centroid vector retrieval unit 910 looks up in the centroid vector database 908 and retrieves the corresponding centroid vector for the user. The retrieved target user centroid vector may be used as a query to the content recommendation module 414 for personalized recommendation. Referring now to FIG. 9(b), each solid dot represents a two-dimensional feature vector (user profile) for an existing user. The existing users are then classified into subgroups based on the similarity of their profiles, and a centroid vector is calculated for each subgroup. When a new user signs up, the new user's profile, represented by a two-dimensional feature vector, is used to retrieve the corresponding centroid vector of a subgroup where the new user fits into.

Figure 9C:
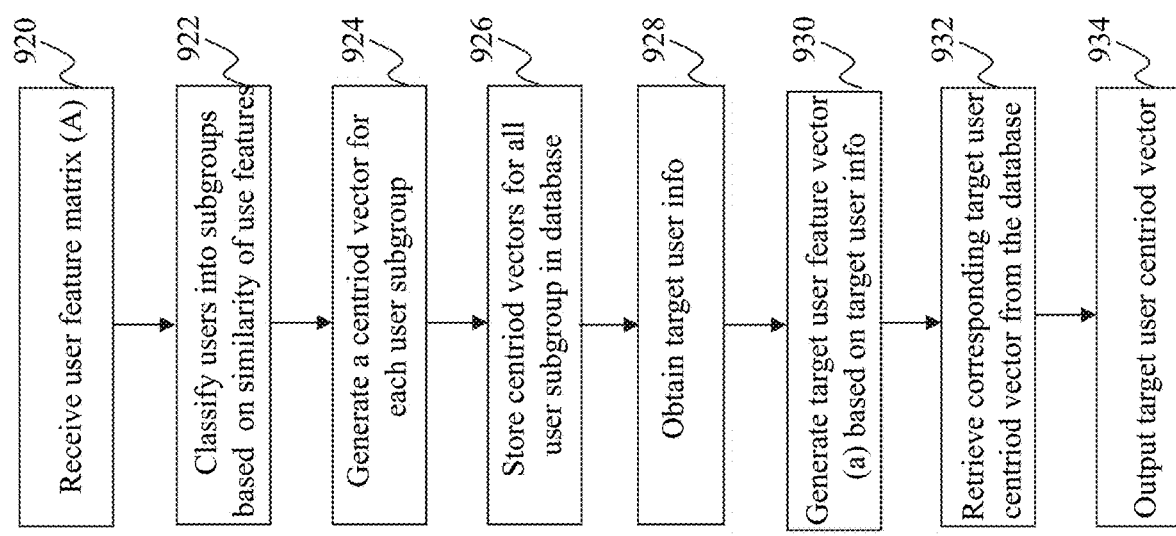
FIG. 9(c) is a flowchart of an exemplary process of the initial modeling unit, according to an embodiment of the present teaching.

FIG. 9(c) is a flowchart of an exemplary process of the initial modeling unit 902, according to an embodiment of the present teaching. Starting at block 920, user feature matrix A is received by the initial modeling module 902. At block 922, existing users are divided into subgroups based on similarity of their features. A centroid vector is then calculated for each user subgroup at block 924, and centroid vectors for the subgroups are stored in the centroid vector database 908 at block 926. Proceeding to block 928, where user information is obtained when a new user signs up or when an existing user updates its attributes. At block 930, a target user feature vector a is generated based on the new user profile. At block 932, corresponding target user centroid vector is retrieved from the centroid vector database 908 based on the target user feature vector a. Eventually, at block 934, the target user centroid vector is outputted as a query to the content recommendation module 414 for personalized recommendation.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the DCP processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 10:
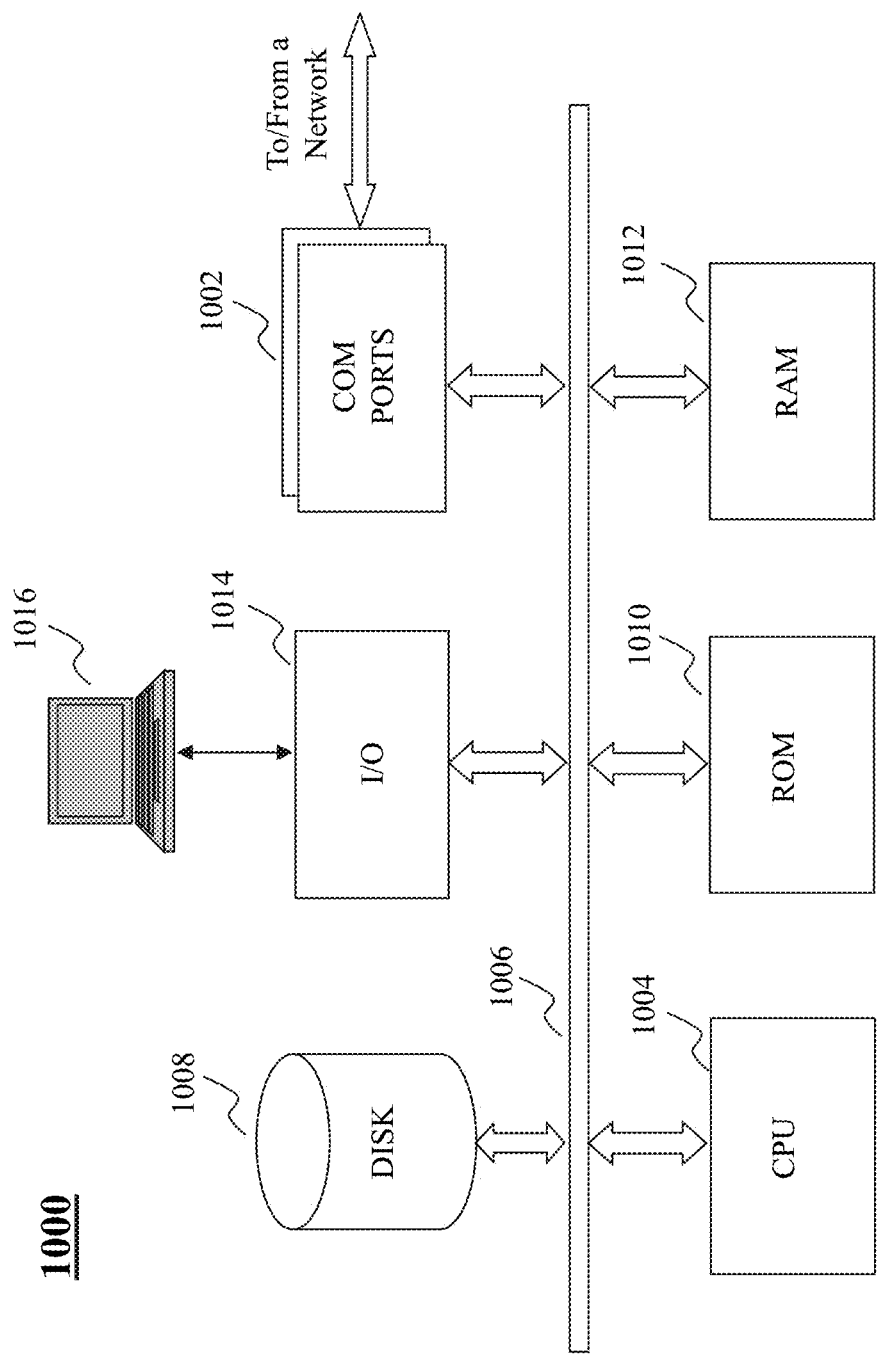
FIG. 10 depicts a general computer architecture on which the present teaching can be implemented.

FIG. 10 depicts a general computer architecture on which the present teaching can be implemented and has a functional block diagram illustration of a computer hardware platform that includes user interface elements. The computer may be a general-purpose computer or a special purpose computer. This computer 1000 can be used to implement any components of the personalized content recommendation architecture as described herein. Different components of the system 100, 114 can all be implemented on one or more computers such as computer 1000, via its hardware, software program, firmware, or a combination thereof. Although only one such computer is shown, for convenience, the computer functions relating to content recommendation may be implemented in a distributed fashion on a number of similar platforms, to distribute the processing load.

The computer 1000, for example, includes COM ports 1002 connected to and from a network connected thereto to facilitate data communications. The computer 1000 also includes a central processing unit (CPU) 1004, in the form of one or more processors, for executing program instructions. The exemplary computer platform includes an internal communication bus 1006, program storage and data storage of different forms, e.g., disk 1008, read only memory (ROM) 1010, or random access memory (RAM) 1012, for various data files to be processed and/or communicated by the computer, as well as possibly program instructions to be executed by the CPU. The computer 1000 also includes an I/O component 1014, supporting input/output flows between the computer and other components therein such as user interface elements 1016. The computer 1000 may also receive programming and data via network communications.

Hence, aspects of the method of recommending content to a user, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution. In addition, the components of the system as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine, each of which has at least one processor, storage, and a communication platform connected to a network for recommending content to a current user, comprising the steps of:

obtaining first information related to one or more previous users, wherein the first information is indicative of tracked interactions of the one or more previous users with online content, wherein the first information is obtained by crawling the online content via a webcrawler;

establishing a model that maps users to topics of interest based on a first matrix representing user features with respect to the one or more previous users and a second matrix representing content features with respect to the one or more previous users, the establishing including:

determining a third matrix representing the user features with respect to kinships of the one or more previous users to each topic of interest and a fourth matrix representing the content features with respect to the kinships of the one or more previous users to each topic of interest, extracting a kinship of the current user to each topic of interest based on the third matrix and the second information related to the current user, and identifying the one or more topics of interest for the current user based on the extracted kinship of the current user to each topic of interest and the fourth matrix;

obtaining second information related to the current user;

determining, based on at least one criterion associated with the current user, a mode of operation by which the established model is to operate;

identifying one or more topics of interest for recommending content to the current user based on the determined mode of the model;
determining a degree of refining the established model based on a level of discrepancy between the recommended content to the current user and an actual content displayed and selected by the current user, wherein refining includes identifying and updating at least one database based on the level of discrepancy; and
providing new content to the current user in accordance with a refined model.

2. The method of claim 1, wherein the first information related to the one or more previous users includes at least one of:
information reflecting profile of the one or more previous users;
information about online activities of the one or more previous users;
information derived based on the information reflecting the profile or the information about the online activities of the one or more previous users; and
information propagated from the information reflecting the profile or the information about the online activities of the one or more previous users.

3. The method of claim 1, wherein the first information corresponds to features characterized based on initial information collected.

4. The method of claim 1, wherein the second information further comprises at least one of:
information reflecting profile of the current user; and
information propagated from the information reflecting the profile of the current user.

5. The method of claim 1, wherein the step of establishing a model comprises the steps of: calculating a fifth matrix representing a transformation from the user features to the content features of the one or more previous users; and identifying the one or more topics of interest for the current user based on the fifth matrix and the second information related to the current user.

6. The method of claim 1, wherein the step of establishing a model comprises the steps of: identifying a plurality of subgroups of the one or more previous users based on a similarity of their profiles; associating a plurality of centroid vectors with the plurality of subgroups of the previous users; determining one of the plurality of centroid vectors for the current user based on the second information related to the current user; and identifying the one or more topics of interest for the current user based on the determined centroid vector for the current user.

7. The method of claim 1, wherein the step of establishing a model comprises the steps of:
determining a plurality of predetermined topics of interest;
extracting a plurality of candidate keywords under each predetermined topic of interest based on the first information for each previous user; and
determining at least one indicative keyword from the plurality of candidate keywords for each previous user.

8. The method of claim 1, wherein the step of establishing a model comprises the steps of:
applying a decision-tree classifier to the first information related to the one or more previous users; and
obtaining a plurality of features from the first information in accordance with a cut-off value of each attribute in the decision tree classifier.

9. A method implemented on at least one machine, each of which has at least one processor, storage, and a communication platform connected to a network for recommending content to a user, comprising the steps of:
establishing a model for estimating topics of interest for the user based on a first matrix representing user features with respect to a plurality of users and a second matrix representing content features with respect to the plurality of users, the establishing including:
determining a third matrix representing the user features with respect to kinships of the plurality of users to each topic of interest and a fourth matrix representing the content features with respect to the kinships of the plurality of users to each topic of interest,
extracting a kinship of the user to each topic of interest based on the third matrix and the second information related to the user, and
identifying the one or more topics of interest for the user based on the extracted kinship of the user to each topic of interest and the fourth matrix;
collecting dynamic information related to the plurality of users, wherein the dynamic information is indicative of tracked interactions of the plurality of users with online content, wherein the dynamic information is obtained by crawling the online content via a web-crawler;
determining, based on at least one criterion associated with the user, a mode of operation by which the established model is to operate;
recommending content based on the established model;
determining a degree of refining the established model based on a level of discrepancy between the recommended content and an actual displayed and selected content, wherein refining includes identifying and updating at least one database based on the level of discrepancy; and
recommending new content with at least one topic of interest to the user, where the at least one topic of interest is estimated based on a refined model.

10. The method of claim 9, wherein the step of establishing a model comprises the steps of:
obtaining first information related to one or more previous users;
establishing a first model that maps from users to topics of interest based on the first information related to the one or more previous users;
obtaining the information related to the user;
identifying one or more topics of interest for the user based on the first model; and
generating the model with the information related to the user incorporated therein.

11. A method implemented on at least one machine, each of which has at least one processor, storage, and a communication platform connected to a network for recommending content to a user, comprising the steps of:
receiving a request for recommending content to a user;
obtaining information indicative of tracked interactions of the user with online content, wherein the information is obtained by crawling the online content via a web-crawler;
retrieving a model that is established based on a first matrix representing user features with respect to the one or more previous users and a second matrix representing content features with respect to the one or more previous users, the establishing including:
determining a third matrix representing the user features with respect to kinships of the one or more previous users to each topic of interest and a fourth matrix representing the content features with respect to the kinships of the one or more previous users to each topic of interest,
    extracting a kinship of the user to each topic of interest based on the third matrix and the second information related to the user, and
    identifying the one or more topics of interest for the user based on the extracted kinship of the current user to each topic of interest and the fourth matrix;
determining, based on at least one criterion associated with the user, a mode of operation by which the retrieved model is to operate;
identifying one or more topics of interest for the user based on the determined mode of the model;
retrieving content in accordance with the one or more topics of interest for the user;
providing the content in the one or more topics of interest as a response to the request; and
determining a degree of refining the retrieved model based on a level of discrepancy between the recommended content to the user and an actual content displayed and selected by the user, wherein refining includes identifying and updating at least one database based on the level of discrepancy.

12. The method of claim 11, further comprising:
ranking the identified one or more topics of interest;
retrieving content in accordance with the one or more topics of interest; and
presenting the content to the user based on the ranking of the identified one or more topics of interest.

13. A system for recommending content to a current user, comprising:
    a user characterization module implemented by a processor and configured to obtain first information related to one or more previous users, wherein the first information is indicative of tracked interactions of the one or more previous users with online content, wherein the first information is obtained by crawling the online content via a web-crawler;
    a modeling module implemented by the processor and configured to establish a model that maps users to topics of interest based on a first matrix representing user features with respect to the one or more previous users and a second matrix representing content features with respect to the one or more previous users, the modeling module further configured to:
        determine a third matrix representing the user features with respect to kinships of the one or more previous users to each topic of interest and a fourth matrix representing the content features with respect to the kinships of the one or more previous users to each topic of interest,
        extract a kinship of the current user to each topic of interest based on the third matrix and the second information related to the current user, and
        identify the one or more topics of interest for the current user based on the extracted kinship of the current user to each topic of interest and the fourth matrix;
    a user request processing unit implemented by the processor and configured to obtain second information related to the current user;
    a mode determining module implemented by the processor and configured to determine, based on at least one criterion associated with the current user, a mode of operation by which the established model is to operate; and
    a topic estimation module implemented by the processor and configured to identify one or more topics of interest for recommending content to the current user based on the determined mode,
wherein
    the modeling module is further configured to determine a degree of refining the established model based on a level of discrepancy between the recommended content to the current user and an actual content displayed and selected by the current user, wherein refining includes identifying and updating at least one database based on the level of discrepancy.

14. The system of claim 13, wherein the first information related to the one or more previous users includes at least one of:
    information reflecting profile of the one or more previous users;
    information about online activities of the one or more previous users;
    information derived based on the information reflecting the profile or the information about the online activities of the one or more previous users; and
    information propagated from the information reflecting the profile or the information about the online activities of the one or more previous users.

15. The system of claim 13, wherein the first information corresponds to features characterized based on initial information collected.

16. The system of claim 13, wherein the second information comprises at least one of:
    information reflecting profile of the current user; and
    information propagated from the information reflecting the profile of the current user.

17. The system of claim 13, wherein the modeling module is further configured to: calculate a fifth matrix representing a transformation from the user features to the content features of the one or more previous users; and identify the one or more topics of interest for the current user based on the fifth matrix and the second information related to the current user.

18. The system of claim 13, wherein the modeling module is further configured to: identify a plurality of subgroups of the one or more previous users based on a similarity of their profiles; associate a plurality of centroid vectors with the plurality of subgroups of the previous users; and determine one of the plurality of centroid vectors for the current user based on the second information related to the current user.

19. The system of claim 13, wherein the modeling module is further configured to:
    determine a plurality of predetermined topics of interest;
    extract a plurality of candidate keywords under each predetermined topic of interest based on the first information for each previous user;
    determine at least one indicative keyword from the plurality of candidate keywords for each previous user; and
    identify the one or more topics of interest for the current user based on the determined centroid vector for the current user.

20. The system of claim 13, wherein the modeling module is further configured to:
    apply a decision-tree classifier to the first information related to the one or more previous users; and obtain a plurality of features from the first information in accordance with a cut-off value of each attribute in the decision tree classifier.

21. A system for recommending content to a user, comprising:
a user content/activity monitor implemented by a processor and configured to collect dynamic information related to a plurality of users, wherein the dynamic information is indicative of tracked interactions of the plurality of users with online content, wherein the dynamic information is obtained by crawling the online content via a web-crawler; and
a content recommendation engine implemented by the processor and configured to:
establish a model for estimating topics of interest for the user based on a first matrix representing user features with respect to the plurality of users and a second matrix representing content features with respect to the plurality of users, the recommendation engine further configured to:
determine a third matrix representing the user features with respect to kinships of the plurality of users to each topic of interest and a fourth matrix representing the content features with respect to the kinships of the plurality of users to each topic of interest,
extract a kinship of the user to each topic of interest based on the third matrix and the second information related to the user, and
identify the one or more topics of interest for the user based on the extracted kinship of the user to each topic of interest and the fourth matrix,
determine, based on at least one criterion associated with the user, a mode of operation by which the established model is to operate,
recommend content based on the established model;
determine a degree of refining the established model based on a level of discrepancy between the recommended content and an actual displayed and selected content, wherein refining includes identifying and updating at least one database based on the level of discrepancy, and
recommend new content with at least one topic of interest to the user, where the at least one topic of interest is estimated based on a refined model.

22. The system of claim 21, wherein the content recommendation engine is further configured to:
obtain first information related to one or more previous users;
establish a first model that maps from users to topics of interest based on the first information related to the one or more previous users;
obtain the information related to the user;
identify one or more topics of interest for the user based on the first model; and
generate the model with the information related to the user incorporated therein.

23. A system for recommending content to a user, comprising:
a content recommendation engine implemented by a processor and configured to:
obtain information indicative of tracked interactions of the user with online content, wherein the information is obtained by crawling the online content via a web-crawler,
retrieve a model that is established based on a first matrix representing user features with respect to the one or more previous users and a second matrix representing content features with respect to the one or more previous users, the establishing including:
determining a third matrix representing the user features with respect to kinships of the one or more previous users to each topic of interest and a fourth matrix representing the content features with respect to the kinships of the one or more previous users to each topic of interest,
extracting a kinship of the user to each topic of interest based on the third matrix and the second information related to the user, and
identifying the one or more topics of interest for the user based on the extracted kinship of the user to each topic of interest and the fourth matrix,
determine based on at least one criterion associated with the user, a mode of operation by which the retrieved model is to operate, and
identify one or more topics of interest for the user based on the determined mode of the model; and
a content portal implemented by the processor and configured to:
receive a request for recommending content to a user,
retrieve content in accordance with the one or more topics of interest for the user; and
provide the content in the one or more topics of interest as a response to the request, wherein the content recommendation engine is further configured to determine a degree of refining the retrieved model based on a level of discrepancy between the recommended content to the user and an actual content displayed and selected by the user, wherein refining includes identifying and updating at least one database based on the level of discrepancy.

24. The system of claim 23, wherein the content portal is further configured to:
rank the identified one or more topics of interest;
retrieve content in accordance with the one or more topics of interest; and
present the content to the user based on the ranking of the identified one or more topics of interest.

25. A non-transitory computer readable medium including computer executable instructions, wherein the instructions, when executed by a computer, cause the computer to perform a method for recommending content to a current user, the method comprising:
obtaining first information related to one or more previous users, wherein the first information is indicative of tracked interactions of the one or more previous users with online content, wherein the first information is obtained by crawling the online content via a web-crawler;
establishing a model that maps users to topics of interest based on a first matrix representing user features with respect to the one or more previous users and a second matrix representing content features with respect to the one or more previous users, the establishing including:
determining a third matrix representing the user features with respect to kinships of the one or more previous users to each topic of interest and a fourth matrix representing the content features with respect to the kinships of the one or more previous users to each topic of interest,
extracting a kinship of the current user to each topic of interest based on the third matrix and the second information related to the current user, and identifying the one or more topics of interest for the current user based on the extracted kinship of the current user to each topic of interest and the fourth matrix;

obtaining second information related to the current user;

determining, based on at least one criterion associated with the current user, a mode of operation by which the established model is to operate;

identifying one or more topics of interest for recommending content to the current user based on the determined mode of the model;

determining a degree of refining the established model based on a level of discrepancy between the recommended content to the current user and an actual content displayed and selected by the current user, wherein refining includes identifying and updating at least one database based on the level of discrepancy; and providing new content to the current user in accordance with a refined model.

26. The non-transitory computer readable medium of claim 25, wherein the first information related to the one or more previous users includes at least one of:

information reflecting profile of the one or more previous users;

information about online activities of the one or more previous users;

information derived based on the information reflecting the profile or the information about the online activities of the one or more previous users; and information propagated from the information reflecting the profile or the information about the online activities of the one or more previous users.

27. The non-transitory computer readable medium of claim 25, wherein the first information corresponds to features characterized based on initial information collected.

28. The non-transitory computer readable medium of claim 25, wherein the second information comprises at least one of:

information reflecting profile of the current user; and information propagated from the information reflecting the profile of the current user.

29. The non-transitory computer readable medium of claim 25, wherein the step of establishing a model comprises the steps of: calculating a fifth matrix representing a transformation from the user features to the content features of the one or more previous users; and identifying the one or more topics of interest for the current user based the fifth matrix and the second information related to the current user.

30. The non-transitory computer readable medium of claim 25, wherein the step of establishing a model comprises the steps of: identifying a plurality of subgroups of the one or more previous users based on a similarity of their profiles; associating a plurality of centroid vectors with the plurality of subgroups of the previous users; determining one of the plurality of centroid vectors for the current user based on the second information related to the current user; and identifying the one or more topics of interest for the current user based on the determined centroid vector for the current user.

31. The non-transitory computer readable medium of claim 25, wherein the step of establishing a model comprises the steps of:

determining a plurality of predetermined topics of interest;

extracting a plurality of candidate keywords under each predetermined topic of interest based on the first information for each previous user; and determining at least one indicative keyword from the plurality of candidate keywords for each previous user.

32. The non-transitory computer readable medium of claim 25, wherein the step of establishing a model comprises the steps of:

applying a decision-tree classifier to the first information related to the one or more previous users; and obtaining a plurality of features from the first information in accordance with a cut-off value of each attribute in the decision tree classifier.

33. A non-transitory computer readable medium including computer executable instructions, wherein the instructions, when executed by a computer, cause the computer to perform a method for recommending content to a user, the method comprising:

establishing a model for estimating topics of interest for the user based on a first matrix representing user features with respect to a plurality of users and a second matrix representing content features with respect to the plurality of users, the establishing including:

determining a third matrix representing the user features with respect to kinships of the plurality of users to each topic of interest and a fourth matrix representing the content features with respect to the kinships of the plurality of users to each topic of interest, extracting a kinship of the user to each topic of interest based on the third matrix and the second information related to the user, and identifying the one or more topics of interest for the user based on the extracted kinship of the user to each topic of interest and the fourth matrix;

collecting dynamic information related to the plurality of users, wherein the dynamic information is indicative of tracked interactions of the plurality of users with online content, wherein the dynamic information is obtained by crawling the online content via a web-crawler;

determining, based on at least one criterion associated with the user, a mode of operation by which the established model is to operate;

recommending content based on the established model;

determining a degree of refining the established model based on a level of discrepancy between the recommended content and an actual displayed and selected content, wherein refining includes identifying and updating at least one database based on the level of discrepancy; and recommending new content with at least one topic of interest to the user, where the at least one topic of interest is estimated based on a refined model.

34. The non-transitory computer readable medium of claim 33, wherein the step of establishing a model comprises the steps of:

obtaining first information related to one or more previous users;

establishing a first model that maps from users to topics of interest based on the first information related to the one or more previous users;

obtaining the information related to the user;

identifying one or more topics of interest for the user based on the first model; and generating the model with the information related to the user incorporated therein.

35. A non-transitory computer readable medium including computer executable instructions, wherein the instructions, when executed by a computer, cause the computer to perform a method for recommending content to a user, the method comprising:

receiving a request for recommending content to a user;

obtaining information indicative of tracked interactions of the user with online content, wherein the information is obtained by crawling the online content via a web-crawler;

retrieving a model that is established based on a first matrix representing user features with respect to the one or more previous users and a second matrix representing content features with respect to the one or more previous users, the establishing including:

determining a third matrix representing the user features with respect to kinships of the one or more previous users to each topic of interest and a fourth matrix representing the content features with respect to the kinships of the one or more previous users to each topic of interest, extracting a kinship of the user to each topic of interest based on the third matrix and the second information related to the user, and identifying the one or more topics of interest for the user based on the extracted kinship of the current user to each topic of interest and the fourth matrix;

determining, based on at least one criterion associated with the user, a mode of operation by which the retrieved model is to operate;

identifying one or more topics of interest for the user based on the determined mode of the model;

retrieving content in accordance with the one or more topics of interest for the user;

providing the content in the one or more topics of interest as a response to the request; and determining a degree of refining the retrieved model based on a level of discrepancy between the recommended content to the user and an actual content displayed and selected by the user, wherein refining includes identifying and updating at least one database based on the level of discrepancy.

36. The non-transitory computer readable medium of claim 35, further comprising:

ranking the identified one or more topics of interest;

retrieving content in accordance with the one or more topics of interest; and presenting the content to the user based on the ranking of the identified one or more topics of interest.

37. The method of claim 1, wherein the mode of operation of the model is further determined based on a time instant of recommending content to the current user.

38. The method of claim 1, wherein tracked interactions include at least click operations performed by the one or more users, and online purchases made by the one or more users.

39. The method of claim 1, wherein refining the established model further includes:

determining whether the first information is to be discarded based on the level of discrepancy between the recommended content and the actual content.

40. The method of claim 1, wherein in response to the level of discrepancy being lower than a threshold, the degree of refining the established model is determined to be a first degree of refining, and in response to the level of discrepancy being higher than the threshold, the degree of refining the established model is determined to be a second degree of refining.

41. The method of claim 40, wherein in the first degree of refining a first and a second database are identified as to be updated, and in the second degree of refining the first database is identified as to be updated, wherein the first database is different than the second database.

* * * * *